(12) United States Patent
Dubay

(10) Patent No.: US 10,465,793 B2
(45) Date of Patent: *Nov. 5, 2019

(54) AUTOMATIC TRANSMISSION SHIFTER ASSEMBLY

(71) Applicant: Nissan North America, Inc., Franklin, TN (US)

(72) Inventor: Carrie Dubay, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/690,781

(22) Filed: Aug. 30, 2017

(65) Prior Publication Data

US 2019/0063595 A1 Feb. 28, 2019

(51) Int. Cl.
*F16H 59/10* (2006.01)
*F16H 61/32* (2006.01)
(Continued)

(52) U.S. Cl.
CPC .......... *F16H 59/105* (2013.01); *F16H 61/22* (2013.01); *F16H 61/24* (2013.01); *F16H 61/32* (2013.01);
(Continued)

(58) Field of Classification Search
None
See application file for complete search history.

(56) References Cited

U.S. PATENT DOCUMENTS 6,308,813 B1 * 10/2001 Carlson ............... F16H 61/22
188/267.1
8,413,533 B2 * 4/2013 Rake .................. F16H 59/0278
74/473.12
(Continued)

FOREIGN PATENT DOCUMENTS

DE 102011110428 B3 11/2012
DE 102012203095 A1 9/2013
(Continued)

OTHER PUBLICATIONS

Magnetorheological fluid, Wikipedia, Aug. 2017.

*Primary Examiner* — Timothy Hannon
(74) *Attorney, Agent, or Firm* — Global IP Counselors, LLP

(57) ABSTRACT

A shifter assembly includes a housing, a shifter member, a movement restrictor, sensors and a positioning device. The housing has a chamber with magnetorheological fluid and an electromagnetic coil to selectively generate a plurality of levels of magnetic field densities through the magnetorheological fluid. The shifter member moves between at least a park position, a reverse position and a drive position. The movement restrictor is disposed within the chamber of the housing for movement between a first section of the chamber and a second section of the chamber. The magnetorheological fluid provides levels of movement resistance to the movement restrictor. The sensors are positioned to detect changes in position of the shifter member. The positioning device is configured to selectively position the shifter member to any of the park position, the reverse position and the drive position in response to electronic signals received by the positioning device.

14 Claims, 12 Drawing Sheets

(51) Int. Cl.
*F16H 61/22* (2006.01)
*F16H 61/24* (2006.01)

(52) U.S. Cl.
CPC .. *F16H 2061/241* (2013.01); *F16H 2061/326* (2013.01)

(56) References Cited

U.S. PATENT DOCUMENTS

| | | | |
|---|---|---|---|
| 2006/0042412 A1* | 3/2006 | Marhefka | F16H 59/0208 74/473.29 |
| 2006/0272442 A1* | 12/2006 | Shimizu | F16H 59/10 74/473.21 |
| 2008/0001422 A1 | 1/2008 | Kwolek | |
| 2011/0005344 A1* | 1/2011 | Haevescher | F16H 59/02 74/473.12 |
| 2011/0056318 A1 | 3/2011 | Rake et al. | |
| 2014/0331804 A1* | 11/2014 | Pfeifer | F16H 59/12 74/473.3 |
| 2016/0215875 A1* | 7/2016 | Grennvall | F16H 59/0204 |
| 2016/0264068 A1 | 9/2016 | Dalton et al. | |
| 2016/0378131 A1 | 12/2016 | Battlogg | |

FOREIGN PATENT DOCUMENTS

| | | |
|---|---|---|
| JP | 2011-032818 A | 2/2011 |
| WO | 2008-110555 A2 | 9/2008 |
| WO | 2017-076422 A1 | 5/2017 |

\* cited by examiner

AUTOMATIC TRANSMISSION SHIFTER ASSEMBLY

BACKGROUND

Field of the Invention

The present invention generally relates to vehicle with a shift-by-wire automatic transmission shifter assembly. More specifically, the present invention relates to shifter assembly that includes a movement restrictor configured to control resistance to movement of the shifter assembly and further provide a haptic response to a vehicle operator when the shifter assembly is shifted between positions.

Background Information

Shift-by-wire transmission systems have been employed in vehicles for many years. These systems include shifter assemblies that send signals to a controller that shifts the transmission to an appropriate setting in response to shifting changes made via the shifter assembly. In an autonomous vehicles, an electronic controller operates the vehicle, including shifting of the transmission. In such autonomous vehicles, the shifter assembly must continue to be moved or shifted to correspond to the setting of the automatic transmission, as set by the electronic controller.

SUMMARY

One object of the present disclosure is to provide a shift-by-wire automatic transmission with a shifter assembly that can be used with an autonomous vehicle controller, and includes haptic responses to shifter movement.

In view of the state of the known technology, one aspect of the present disclosure is to provide an automatic transmission shifter assembly with a housing, a shifter member, a movement restrictor, a plurality of sensors and a positioning device. The housing defines a chamber with magnetorheological fluid disposed therein and further includes at least one electromagnetic coil configured to selectively generate a plurality of levels of magnetic field densities through the magnetorheological fluid. The shifter member is supported to the housing for movement between at least a park position, a reverse position and a drive position. The movement restrictor is connected to the shifter member for movement therewith and is disposed within the chamber of the housing for movement between a first section of the chamber and a second section of the chamber. The magnetorheological fluid provides one of a plurality of levels of movement resistance to the movement restrictor during movement between the first section and second section of the chamber. Each of the plurality of levels of movement resistance being induced by a corresponding one of the plurality of levels of magnetic field densities is generated by the electromagnetic coil. The plurality of sensors are positioned and configured to detect changes in position of the shifter member. The positioning device is within the housing and is connected to the shifter member. The positioning device is configured to selectively position the shifter member to any of the park position, the reverse position and the drive position in response to electronic signals received by the positioning device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
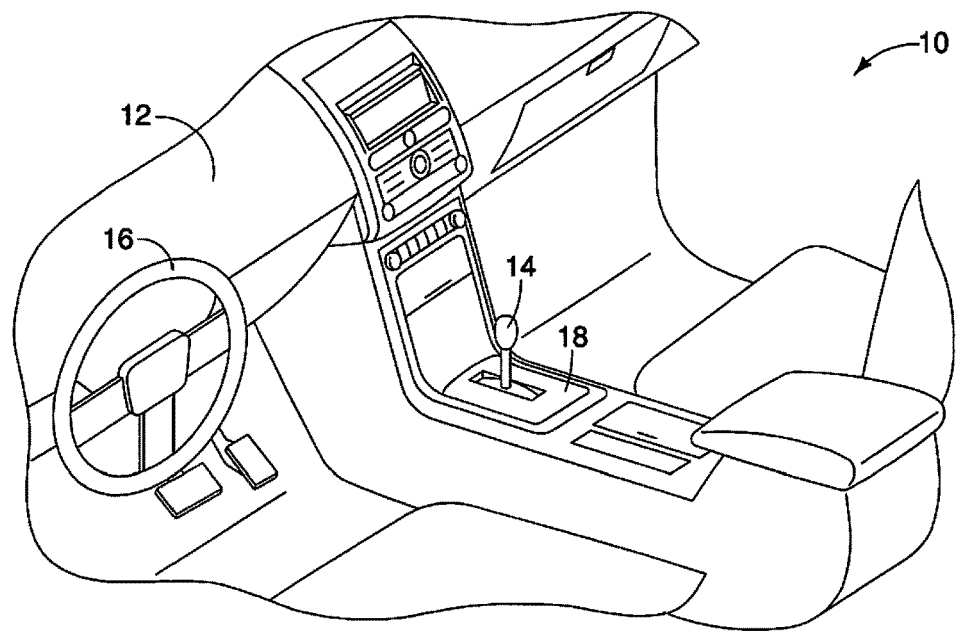
FIG. 1 is a perspective view of a passenger compartment of a vehicle, showing a steering column and a center console, with a shifter assembly installed to the center console in accordance with a first embodiment.

Referring initially to FIG. 1, a vehicle 10 having a passenger compartment 12 that includes an automatic transmission shifter assembly 14 is illustrated in accordance with a first embodiment.

The passenger compartment 12 of the vehicle 10 includes a steering column 16 and a center console 18. The automatic transmission shifter assembly 14 (hereinafter referred to as the shifter assembly 14) is installed to the center console 18, but can alternatively be installed to a floor F of the vehicle 10, or, as described in an alternative embodiment below, to the steering column 16. In the first embodiment, the shifter assembly 14 is installed to the center console 18. A detailed description of the shifter assembly 14 is provided below following a brief description of the vehicle 10.

In the depicted embodiment, the vehicle 10 is a shift-by-wire vehicle. Specifically, the vehicle 10 includes an automatic transmission 20 (FIG. 5) that shifts between, for example a parked state, reverse state, a neutral state, a drive state, and one or more fixed gear states in response to electronic signals, not from movement of a cable or mechanical linkage. As described in greater detail below, the shifter assembly 14 is configured to provide sensor data corresponding to a desired state of operation of the automatic transmission 20.

The automatic transmission 20 can be configured with any of a variety of transmission configurations, such as a constant velocity arrangement, or conventional automatic transmission arrangement including clutch packs and bands that loosen and tighten around the clutch packs in response to fluid pressure for changing the state of the automatic transmission 20, in a conventional manner. Since automatic transmissions are conventional mechanical and/or hydraulic devices, further description is omitted for the sake of brevity.

The automatic transmission 20 operates as follows. In the parked state, the automatic transmission 20 is set such that the drive wheels (front wheels in a front wheel drive vehicle, rear wheels in a rear wheel drive vehicle and all wheels in a four-wheel drive or all-wheel drive vehicle) are locked and rotation of the drive wheels is prevented. In the reverse state, the automatic transmission 20 is set to transmit rotary power from a vehicle engine to the drive wheels such that the vehicle 10 moves in a reverse direction (backing up). In the neutral state, the drive wheels are free to rotate with no power provided from the vehicle engine. In the drive state, the automatic transmission 20 is set such that the drive wheels are provided with power from the vehicle engine to move the vehicle 10 in a forward direction. In fixed gear states (such as "low" or "$1^{st}$" and "$2^{nd}$") the automatic transmission 20 is set to rotate the drive wheels with a fixed output ratio of the rotational speed from the vehicle engine to the drive wheels, in a conventional manner.

Figure 5:
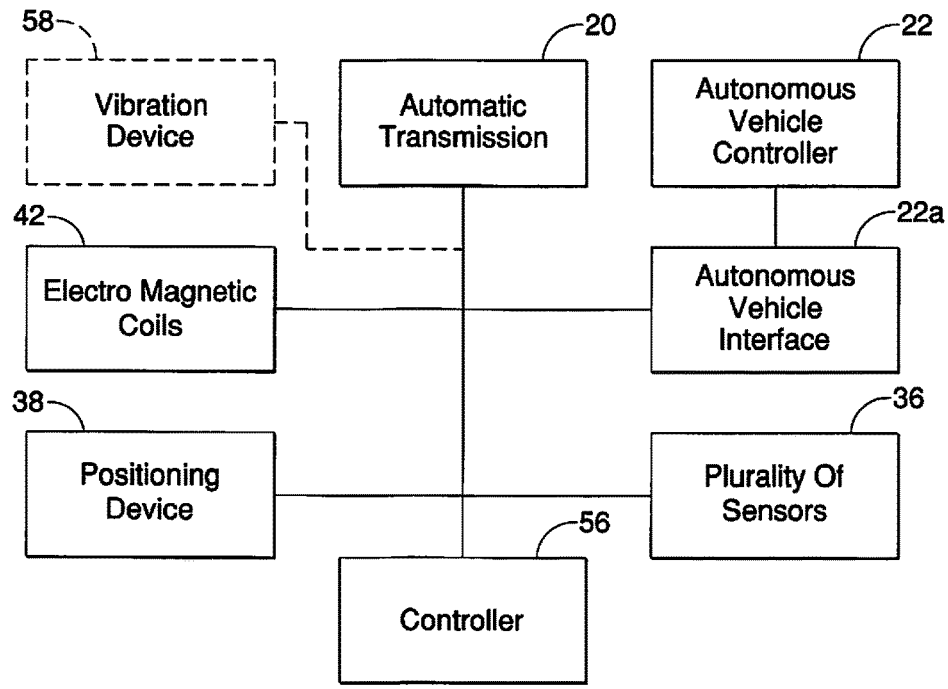
FIG. 5 is a block diagram showing an electronic controller connected to the sensors, the electromagnetic coils and the positioning device of the shifter assembly, and further connected to an automatic transmission, an optional vibration device, and an autonomous vehicle controller, in accordance with the first embodiment.

The vehicle 10 can also include sensors (not shown), communication systems (not shown), steering and braking controls (not shown) and an autonomous vehicle controller 22 (FIG. 5). The autonomous vehicle controller 22 is configured to engine/power plant operation, vehicle control speed, control braking, steering of the vehicle 10 vehicle navigation without the assistance of a vehicle operator. Such autonomous vehicle systems are disclosed in, for example, U.S. Pat. Nos. 9,448,559 and 9,404,761, both assigned to Nissan North America. The disclosures of U.S. Pat. Nos. 9,448,559 and 9,404,761, are incorporate by reference in their entirety. Since autonomous vehicles and autonomous vehicle controllers such as the autonomous vehicle controller 22 are conventional systems, further description is omitted for the sake of brevity.

Figure 2:
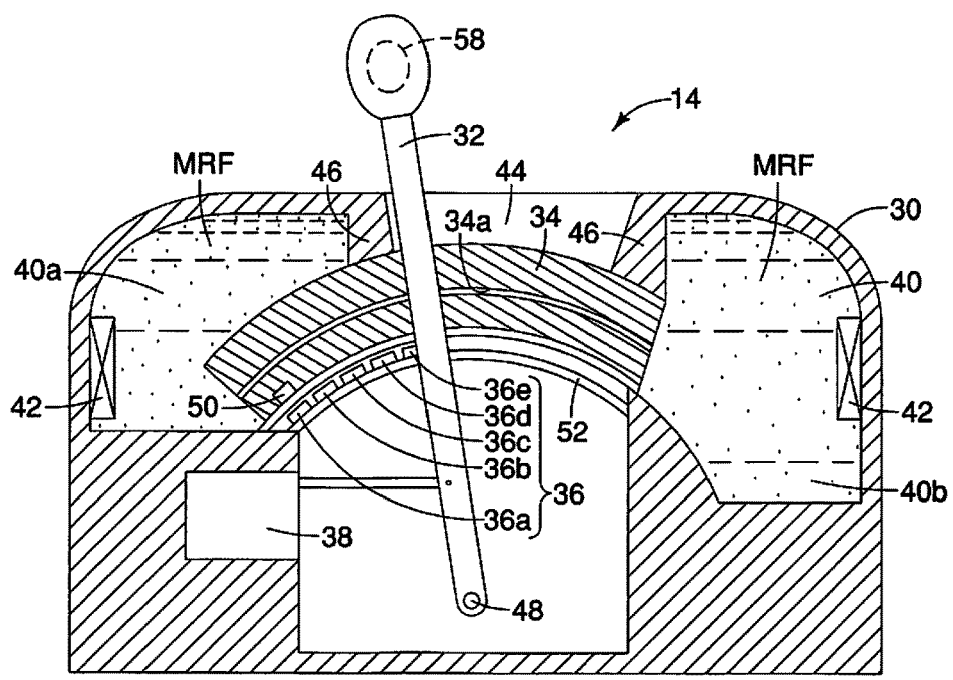
FIG. 2 is a cross-sectional side view of the shifter assembly removed from the center console and the vehicle, showing a housing, a shifter member, a movement restrictor and electromagnetic coils within chamber of the housing filled with magnetorheological fluid, and a positioning device, with the shifter member in a park position in accordance with the first embodiment.
Figure 3:
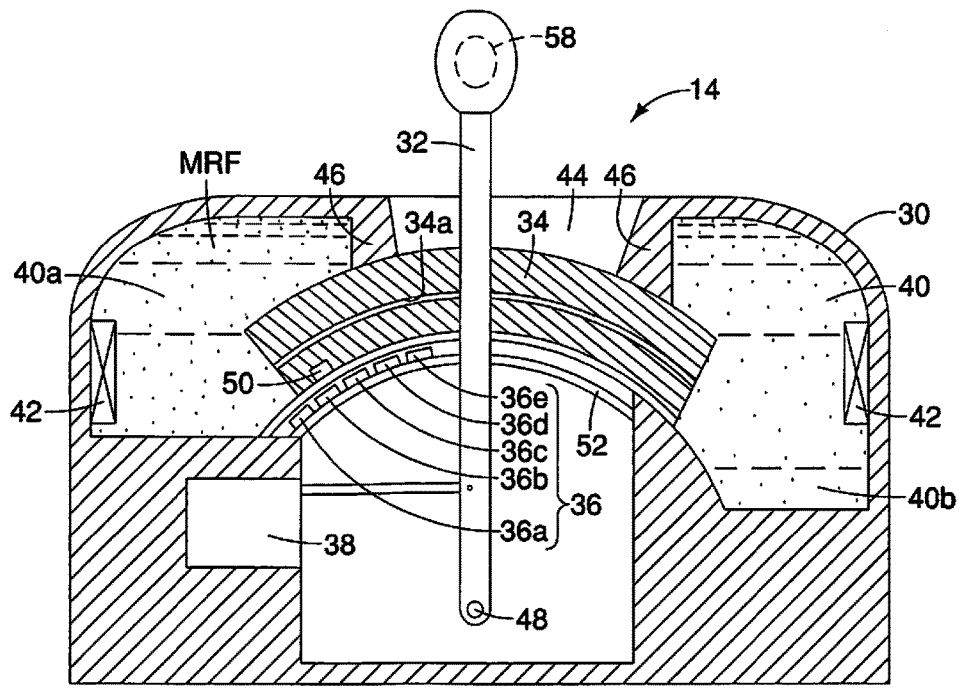
FIG. 3 is another cross-sectional side view of the shifter assembly depicted in FIG. 2, showing the shifter member in a reverse position in accordance with the first embodiment.
Figure 4:
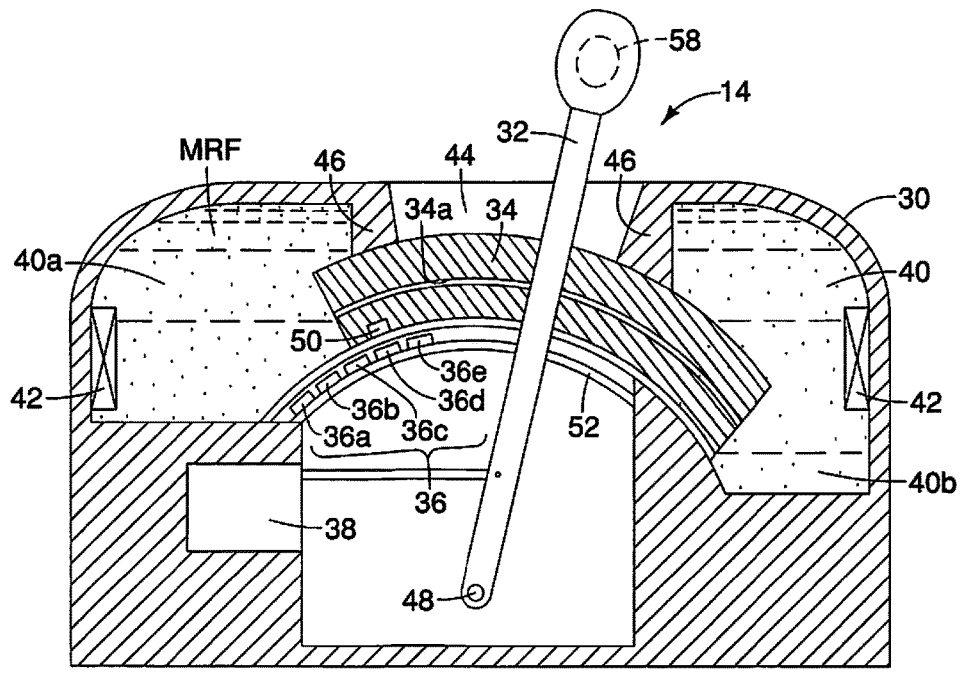
FIG. 4 is another cross-sectional side view of the shifter assembly depicted in FIGS. 2 and 3, showing the shifter member in a drive position in accordance with the first embodiment.

A description of the shifter assembly 14 in accordance with a first embodiment is now provided with specific reference to FIGS. 2, 3 and 4. The shifter assembly 14 basically includes a housing 30, a shifter member 32, a movement restrictor 34, a plurality of sensors 36 and a positioning device 38.

The housing 30 defines a chamber 40 that is at least partially or completely filled with magnetorheological fluid MRF. The chamber 40 has a first section 40a (a front section) and a second section 40b (a rear section). Two electromagnetic coils 42 (also referred to as electrodes) are installed within the housing 30. Specifically, one of the coils 42 is installed within the first section 40a of the chamber 40, and a second one of the coils 42 is installed within the second section 40b of the chamber 40. The electromagnetic coils 42 are configured to selectively generate a plurality of differing levels of magnetic field densities through the magnetorheological fluid MRF, as described in greater detail below. Magnetorheological fluids respond to the presence of a magnetic field with a corresponding increase viscosity due to alignment of iron particles suspended therein with the lines of force of the magnetic fields in a conventional manner. Since magnetorheological fluids and their response to magnetic fields are conventional and well known, further description is omitted for the sake of brevity.

The housing 30 further includes an opening or slot 44 along an upper surface thereof. The slot 44 is dimensioned to allow movement of the shifter member 32. The housing further includes a seal or seal members 46 that seal the slot 44 such that the magnetorheological fluid MRF is retained within the chamber 40.

The shifter member 32 is a lever that pivots about a pivot pin 48 supported by the housing 30 in a conventional manner. The chamber 40 is located within the housing 30 spaced apart from the pivot pin 48. As shown in FIGS. 2, 3 and 4, the shifter member 32 pivots between a plurality of positions such as a park position (FIG. 2), a reverse position (FIG. 3), a neutral position (not shown) and a drive position (FIG. 4) and at least one fixed gear position (not shown), such as a first gear position. Additionally, the shifter member 32 can pivot to a neutral position (between the reverse and drive position) and a fixed gear position (adjacent to the drive position). It should be understood from the drawings and the description herein that the parked position of the shifter member 32 corresponds to setting the automatic transmission 20 to the parked state. Similarly, the reverse position of the shifter member 32 corresponds to setting the automatic transmission 20 to the reverse state, and the drive position of the shifter member 32 corresponds to setting the automatic transmission 20 to the drive state (forward motion state).

The movement restrictor 34 is rigidly and fixedly attached to the shifter member 32 for movement therewith. Movement of the shifter member 32 causes corresponding movement of the movement restrictor 34 within the chamber 40. Specifically, the movement restrictor 34 is disposed within the chamber 40 and therefore moves between the first section 40a and the second section 40b of the chamber 40 in correspondence with movement of the shifter member 32.

In the first embodiment, the movement restrictor 34 is an arcuately shaped block of material (in effect, a piston) that includes at least one port 34a formed therein. A center of the arcuate shape of the movement restrictor 34 coincides with the center of the pivot pin 48. The port 34a extends from a first side of the movement restrictor 34 to a second side thereof. Hence, the port 34a is in fluid communication with both the first section 40a and the second section 40b of the chamber 40. The seal members 46 contact an upper surface of the movement restrictor 34 providing a seal between the movement restrictor 34 and the slot 44 of the housing 30. Since the movement restrictor 343 has an overall dimension (in cross-section) that is between 30% and 50% of the overall volume of the chamber 40, movement of the movement restrictor 34 causes movement of the magnetorheological fluid MRF through the port 34a. Specifically, if the movement restrictor 34 is moved part way out of the first section 40a and part way into the second section 40b of the chamber 40, the magnetorheological fluid MRF must flow through the port 34a from the second section 40b and into the first section 40a of the chamber 40, and vice versa.

Hence, movement of the movement restrictor 34 between the first section 40a and the second section 40b of the chamber 40 follows an arcuate path (about the pivot pin 48) and causes movement of the magnetorheological fluid MRF through the port 34a. As is described in greater detail below, activation of the coils 42 to generate an electromagnetic field in and around the chamber 40 causes the magnetorheological fluid MRF to exhibit an increase in viscosity (the magnetorheological fluid MRF becomes thicker and resists movement). Hence, when the coils 42 have been activated, a vehicle operator will experience a greater level of resistance when moving the shifter member 32.

The movement restrictor 34 includes a sensor member 50 mounted on or along a lower surface of the movement restrictor 34 and is described in greater detail below.

A lower end of the chamber 40 is sealed by a sensor plate 52 that is non-movably fixed within the housing 30. The sensor plate 52 has an arcuate shape with a center of the arcuate shape of the sensor plate 52 coinciding with the center of the pivot pin 48. An upper surface of the sensor plate 52 is positioned adjacent to the lower surface of the movement restrictor 34.

The plurality of sensors 36 are mounted to the sensor plate 52 at predetermined spaced apart locations along the upper surface thereof as shown in FIGS. 2-4. The plurality of sensors 36 include a park sensor 36a, a reverse sensor 36b, a neutral sensor 36c, a drive sensor 36d and a fixed gear sensor 36e.

The sensors 36 are positioned and configured to detect changes in position of the sensor member 50 and hence changes in position of the shifter member 32. Specifically, when the shifter member 32 is moved, the movement restrictor 34 and the sensor member 50 move with the shifter member 32. As the sensor member 50 to, from or past any one or adjacent pairs of the sensors 36, the movement of the sensor member 50 is detected by the sensors 36. Response to detection of movement of the sensor member 50 and the shifter member 32 is described in greater detail below.

The positioning device 38 is fixedly attached to the housing 30. The positioning device 38 is, for example. a stepper motor or hydraulic device that is configured to accurately and precisely position and re-positioned an attached mechanical object, such as the shifter member 32. Since such positioning devices are conventional devices, further description is omitted for the sake of brevity.

In the depicted embodiment, the positioning device 38 is disposed within the housing 30 below the chamber 40 and the sensor plate 52. Further, the positioning device 38 is located between the pivot pin 48 and the chamber 40. More specifically, the positioning device 38 is located below the chamber 40 and above the pivot pin 48. The positioning device 38 is operatively connected to the shifter member 32. Specifically, the positioning device 38 is configured to selectively position the shifter member 32 to any of the park position, the reverse position and the drive position in response to electronic signals received by the positioning device 38 in a manner described in greater detail below.

As shown in FIG. 5, portions of the shifter assembly 14 are electrotonically connected to an electronic controller 56 that is disposed within the vehicle 10. Specifically, each of the plurality of sensors 36 (36a, 36b, 36c, 36d and 36e) are connected to the controller 56; the positioning motor 38 is connected to the controller 56; and the electromagnetic coils 42 are connected to the controller 56. Further, the controller 56 is also electronically connected to the automatic transmission 20, an autonomous vehicle interface 22a that is further connected to the autonomous vehicle controller 22, and an optional vibration device 58. In other words, the electronic controller 56 (hereinafter referred to as a controller 56) is in electronic communication with the sensors 36, the positioning motor 38, the electromagnetic coils 42, the automatic transmission 20, the autonomous vehicle interface 22a (and the autonomous vehicle controller 22) and the optional vibration device 58.

Figure 6:
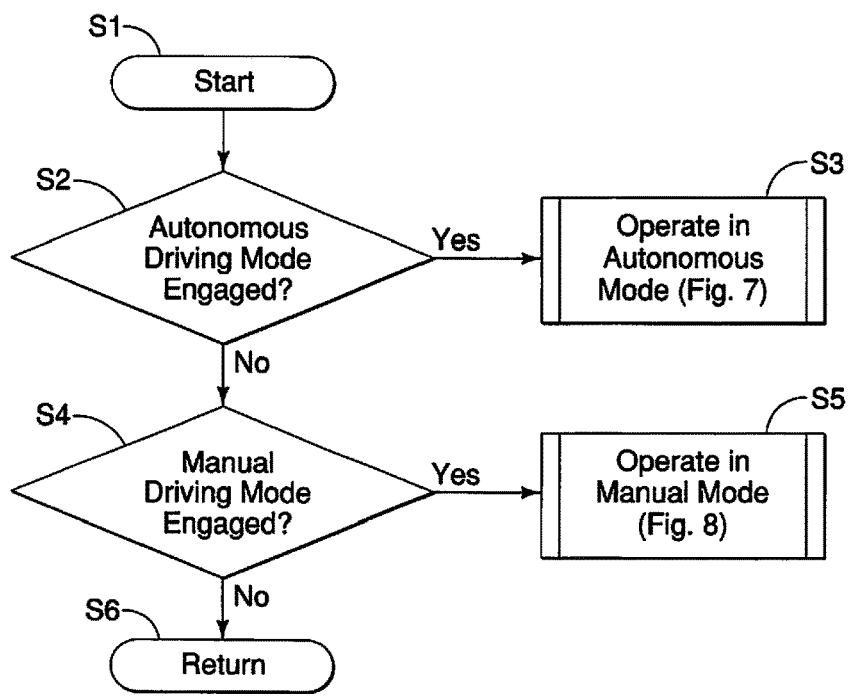
FIG. 6 is a flowchart showing basic initial operations of the electronic controller and the shifter assembly in accordance with the first embodiment.
Figure 7:
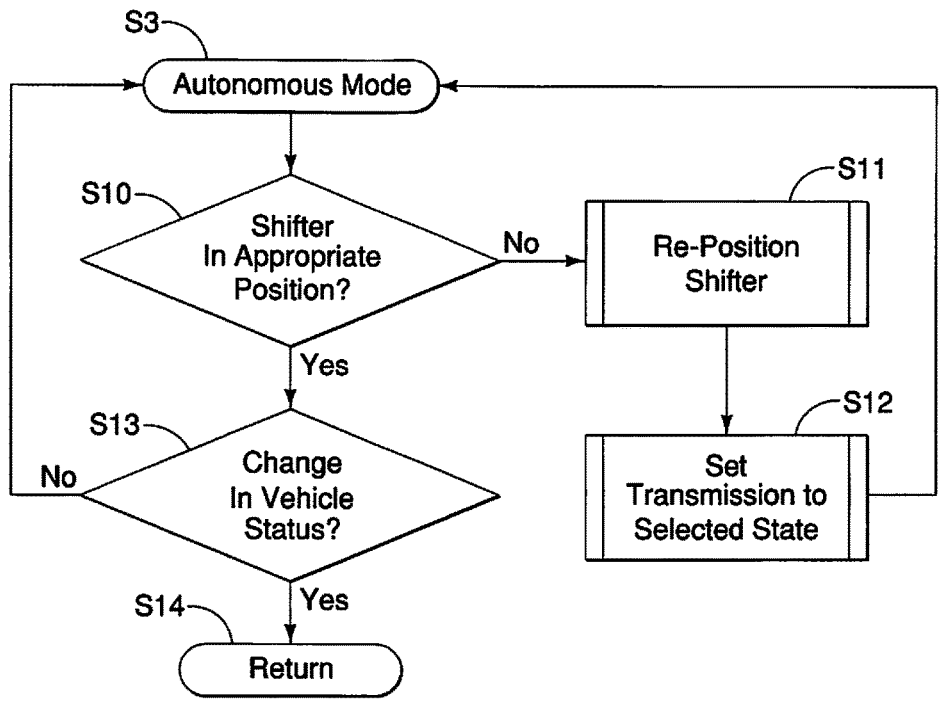
FIG. 7 is a flowchart showing basic operations of the electronic controller and the shifter assembly when operating in an autonomous mode where the autonomous vehicle controller fully operating the vehicle, in accordance with the first embodiment.
Figure 8:
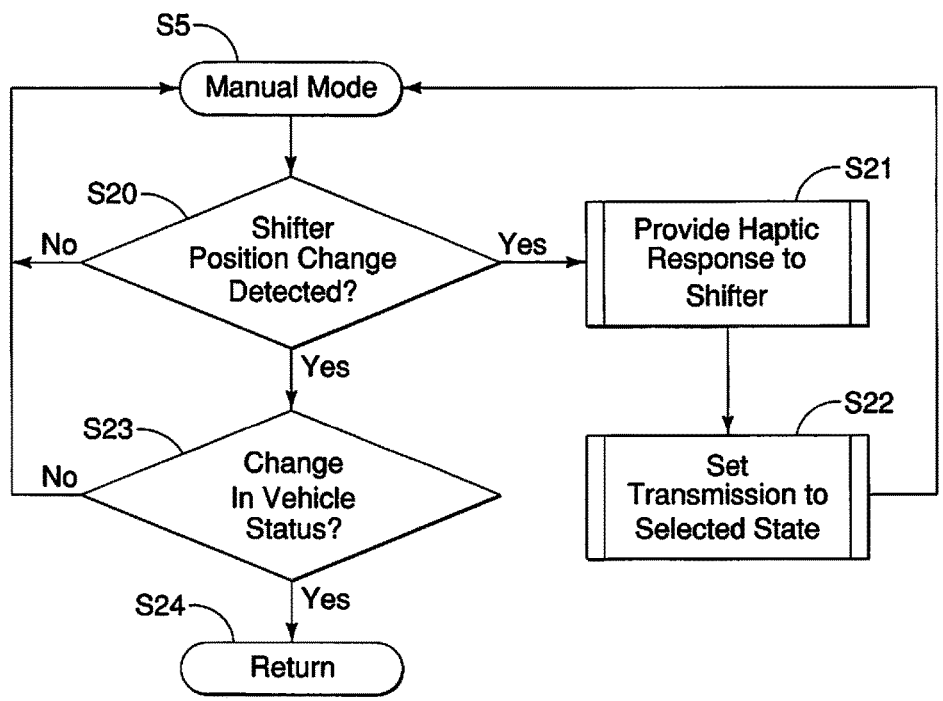
FIG. 8 is another flowchart showing basic operations of the electronic controller and the shifter assembly when operating in a manual mode where a vehicle operator is manually operating the vehicle, in accordance with the first embodiment.

FIGS. 6, 7 and 8 are flowcharts that outline one example of basic logic used by the controller 56. In FIG. 6, at step S1, the controller 56 starts up, for instance, when the vehicle 10 is started and movement of the vehicle 10 is anticipated. The controller 56 then moves to step S2, where the controller 56 determines whether or not the vehicle 10 is being operated in a self-driving or autonomous vehicle mode. At step S2, if the controller 56 determines that the vehicle 10 is operating or to be operated in the autonomous vehicle mode, then operation moves to step S3, and thereafter to the logic presented in FIG. 7.

At step S2, if the controller 56 if the controller 56 determines that the vehicle 10 is not operating in the autonomous vehicle mode, then operation moves to step S4. At step S4, the controller 56 determines whether or not the vehicle 10 is operating or to be operated in the manual mode where a vehicle operator (a person) is operating the vehicle 10. If yes, then operation moves to step S5, and thereafter to the logic presented in FIG. 8. If no, then operation returns to step S1.

FIG. 7 shows an example of basic operational steps with the vehicle 10 operating in the autonomous vehicle mode. At step S10, the controller 56 determines whether or not the shifter member 32 is in an appropriate position.

Specifically, since the vehicle 10 is self-driving in the autonomous vehicle mode, driving and operation instructions are implemented by the autonomous vehicle controller 22. When the shifter assembly 14 needs to be operated (change the operational state of the automatic transmission 20), the autonomous vehicle controller 22 receives information (for example, sensor data) from the controller 56 via the autonomous vehicle interface 22a. The autonomous vehicle controller 22 determines whether or not the shifter assembly 14 should be operated and sends appropriate instructions to the controller 56 via the autonomous vehicle interface 22.

Therefore, at step S10, the controller 56 determines whether or not the shifter member 52 is in a position corresponding to that communicated to the controller 56 from the autonomous vehicle controller 22. If the shifter member 52 is not in the required position, then operation moves to step S11, where the controller 56 operates the positioning device 38 to move the shifter member 32 to the required position as communicated by the autonomous vehicle controller 22. Next, at step S12, the controller 56 sets or shifts the automatic transmission 20 to the required setting (one of the parked state, the reverse state, the neutral state, the drive state, and one of the fixed gear states).

At step S10, if the controller 56 determines that the shifter member 52 is in the required position, then operation moves to step S13. At step S13, the controller 56 determines whether or not the vehicle status has changed. For example, the controller 56 determines whether or not the vehicle operator has switch from the autonomous vehicle mode to the manual mode. If the vehicle status has changed, then operation returns at step S14 to the step S1 in FIG. 6. If there has been no change in vehicle status, then operation returns to step S3 for further iterations of the logic set forth in FIG. 7.

FIG. 8 shows an example of basic operational steps with the vehicle 10 operating in the manual mode. At step S20, the controller 56 determines whether or not there has been a change in the position of the shifter member 32 in response to vehicle operator activity. Specifically, has the vehicle operator moved the shifter member 32 from one position to another position? At step S20, if the controller 56 determines that the position of the shifter member 32 has changed, operation moves to step S21. At Step S21, a haptic response is provided to the shifter member 32 in a manner described in greater detail below. Next, operation moves to step S22. At step S22, the controller 56 sets or shifts the automatic transmission 20 to the setting corresponding to the shifter member position as set by the vehicle operator. Specifically, if the shifter member 32 has been moved to the park position (FIG. 2), the automatic transmission 20 is shifted or set to the parked state. Similarly, if the shifter member 32 has been moved to the reverse position (FIG. 3), the automatic transmission 20 is shifted or set to the reverse state, and if the shifter member 32 has been moved to the drive position (FIG. 4), the automatic transmission 20 is shifted or set to the drive state.

At step S20, if the controller 56 determines that the position of the shifter member 32 has not changed, operation moves to step S23. At step S23, the controller 56 determines whether or not the vehicle status has changed. For example, the controller 56 determines whether or not the vehicle has switch from the manual mode to the autonomous vehicle mode. If the vehicle status has changed, then operation returns at step S24 to the step S1 in FIG. 6. If there has been no change in vehicle status, then operation returns to step S5 for further iterations of the logic set forth in FIG. 8.

A description is now provided for the workings of the plurality of sensors 36, the sensor member 50 and the controller 56. The sensors 36 can be any of a variety of proximity sensors. For example, the sensors 36 can be configured to detect electromagnetic fields with the sensor member 50 being a permanent magnet. Alternatively, the sensors 36 can be configured to emit electromagnetic radiation (infrared, for example) that is reflected back by the sensor member 50 with the reflection detected by the sensor 36. Further, the sensors 36 can be capacitive, photoelectric or inductive type sensors. Since proximity sensors are conventional electronic devices, further description is omitted for the sake of brevity.

When the shifter member 32 is moved, the movement restrictor 34 and the sensor member 50 move as one with the shifter member 32. As shown in FIG. 2 with the shifter member 32 in the park position, the sensor member 50 is located adjacent to the park sensor 36a. Each of the park sensor 36a, the reverse sensor 36b, the neutral sensor 36c, the drive sensor 36d and the fixed gear sensor 36e is configured to detect the presence of the sensor member 50. Therefore, as the sensor member 50 passes by one of the sensors 36, the corresponding one of the sensors 36 transmits a signal to the controller 56. Hence, the controller 56 can determine the location of the sensor member 50 (and the location of the shifter member 32).

The sensors 36 also detect when the sensor member 50 is moving from being adjacent to one of the sensors 36 to an adjacent one of the sensors 36. Signals from the two adjacent sensors 36 are received by the controller 56. Consequently, the controller 36 determines the shifting process between one shifter position and another shifter position.

As mentioned above, the magnetorheological fluid MRF responds to the presence of a magnetic field by becoming more viscous (increasing viscosity). Put another way, the greater the magnetic field strength induced by the coils 42, the greater the viscosity of the magnetorheological fluid MRF. The controller 56 is configured to operate the coils 42 at any of a predetermined levels of magnetic field strengths (corresponding to differing levels of movement resistance). For example, the controller 56 can operate the coils 42 to produce a low level of magnetic field strength, a medium level of magnetic field strength and a maximum level of magnetic field strength. The maximum level of magnetic field strength can correspond to a condition where movement of the movement restrictor 34 is difficult, if not impossible for the average vehicle operator. The maximum level of magnetic field strength produced by the coils 42 can prevent movement of the shifter member 32. The low level of magnetic field strength produced by the coils 42 can be set to retain the shifter member 32 in position, but easily allow the vehicle operator to move the shifter member 32. The medium level of magnetic field strength can be set to provide an increase in resistance to movement of the shifter member 32 but still allow the vehicle operator to move the shifter member 32.

When the controller 56 is operating in the manual mode with a vehicle operator moving the shifter member 32 to a different position, the controller 56 determines that the shifter member is being moved in response to the signals sent by corresponding ones of the sensors 36, and can provide an optional haptic response for the benefit of the vehicle operator. In the depicted embodiment, the haptic response can be produced by the magnetorheological fluid MRF. Specifically, as mentioned above, the controller 56 operates the coils 42 to induce a low level of magnetic field strength to the magnetorheological fluid MRF to retain the shifter member 32 in position. When the controller 56 determines that the shifter member 32 is being moved or shifted by the vehicle operator, the controller 56 can increase the magnetic field produced by the coils 42 to the medium level of magnetic field strength during the movement or shifting of the shifter member 32 mimicking the resistance felt by a vehicle operator shifting a conventional center console shifter assembly. Thus, the medium level of magnetic field strength produced by the coils 42 can be employed to provide the haptic response to movement of the shifter member 32.

Alternatively, the shifter member 32 can include the optional vibration device 58. The controller 56 can alternatively, or additionally cause the optional vibration device 58 to vibrate thereby producing the haptic response and providing the vehicle operator with confirmation that the position of the shifter member 32 is being changed by the vehicle operator.

The controller 56 is further configured such that when the shifter member 32 is placed in the park position (with the sensor member 50 aligned with the park sensor 36*a*), the automatic transmission 20 is shifted to the parked state. Further, in the parked state, if the engine of the vehicle 10 is turned off, the controller 56 increases the output of the coils 42 to produce the maximum level of magnetic field strength, thereby locking the shifter member 32 in position.

Alternatively, the shifter assembly 14 can be provided with a conventional shifter locking mechanism (not shown) that prevents movement of the shifter member 32 away from the park position. Specifically, the shifter member 32 can only be moved out of the park position when in the manual mode in response to having the engine operating and having the vehicle operator pressing on a brake pedal. Only then is the conventional shifter locking mechanism released by the controller 56. In the autonomous vehicle mode, the controller 56 can release the conventional shifter locking mechanism (or lower the level of magnetic field strength) and shift the shifter member 32 automatically.

The controller 56 is further configured to conduct the following operations, as per the example logic discussed above. When the shifter member 32 is moved to the reverse position (with the sensor member 50 aligned with the reverse sensor 36*b*), the automatic transmission 20 is shifted to the reverse state so that the vehicle 10 can back up. When the shifter member 32 is moved to the neutral position (with the sensor member 50 aligned with the neutral sensor 36*c*), the automatic transmission 20 is shifted to the neutral state so that the vehicle 10 can roll freely. When the shifter member 32 is moved to the drive position (with the sensor member 50 aligned with the drive sensor 36*d*), the automatic transmission 20 is shifted to the drive state so that the vehicle 10 can move forward. When the shifter member 32 is moved to the fixed gear position (with the sensor member 50 aligned with the fixed gear sensor 36*e*), the automatic transmission 20 is shifted to the drive state so that the vehicle 10 moves with a fixed gear ratio between the engine and the automatic transmission 20.

Second Embodiment

Figure 9:
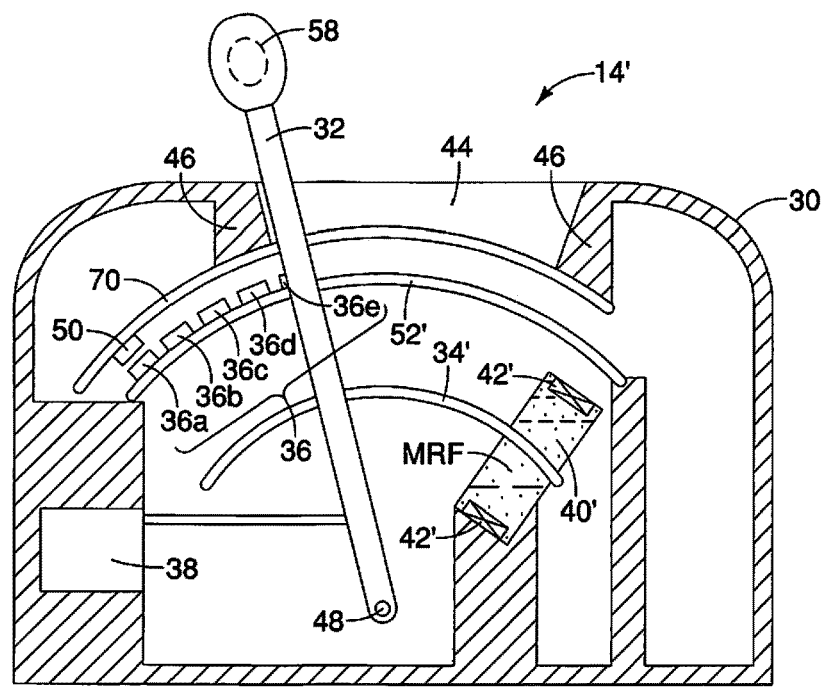
FIG. 9 is a cross-sectional side view of a shifter assembly showing a housing, a shifter member, a movement restrictor and electromagnetic coils within chamber of the housing filled with magnetorheological fluid, and a positioning device, with the shifter member in the park position in accordance with a second embodiment.
Figure 10:
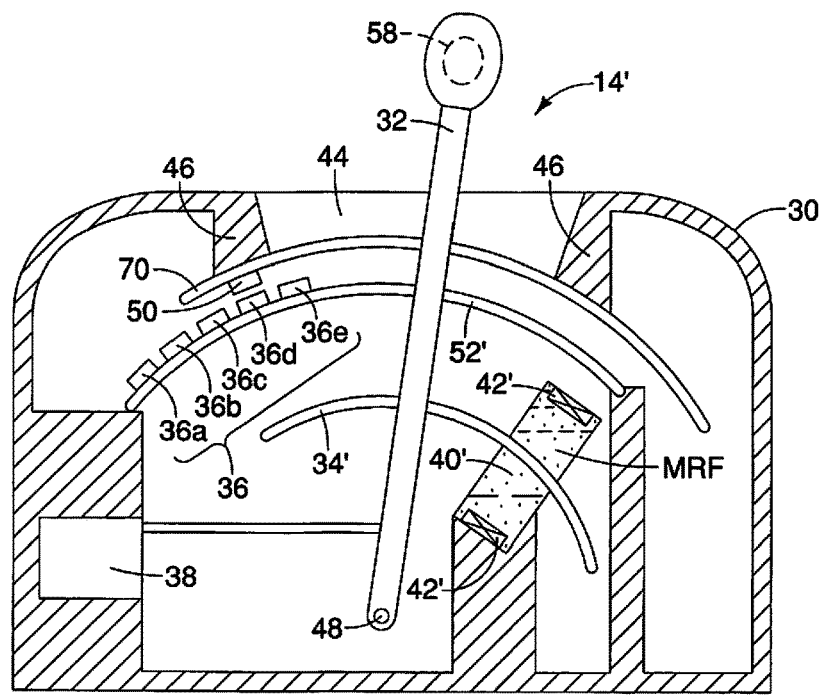
FIG. 10 is another cross-sectional side view of the shifter assembly showing the shifter member in the drive position in accordance with the second embodiment.

Referring now to FIGS. 9 and 10, a shifter assembly 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The shifter assembly 14' includes the housing 30, the shifter member 32, the plurality of sensors 36, the positioning device 38, the optional vibration device 58 and the controller 56 (not shown in FIGS. 9 and 10) as described above with respect to the first embodiment. The housing 30 includes the slot 44, the seal members 46, the pivot pin 48.

However, in the second embodiment, the housing 30 includes an arcuate sealing plate 70 that contacts and slides against the seal member 46. The arcuate sealing plate 70 is rigidly attached to the shifter member 32 and moves therewith. The housing further includes a sensor plate 52' fixed in position within the housing 30. The sensors 36 are mounted to the sensor plate 52'. The housing 30 also includes a chamber 40' that includes a rigid structure fixed in position within the housing 30. The chamber 40' surrounds and encloses magnetorheological fluid MRF. The chamber 40' includes electromagnetic coils 42' at either end thereof.

In the second embodiment, an arcuate shaped movement restrictor 34' is rigidly attached to the shifter member 32 for movement therewith following an arcuate path. The movement restrictor 34' also extends through openings in the chamber 40' such that the movement restrictor 34' is in direct contact with the magnetorheological fluid MRF. The movement restrictor 34' is configured such that in response to activation of the coils 42', the movement restrictor 34' experiences an increase in resistance to movement, or when a maximum level of magnetic field density is applied, can be clamped in place (prevented from moving) relative to the chamber 40'. The logic used by the controller 56 is identical to that of the first embodiment.

Third Embodiment

Figure 11:
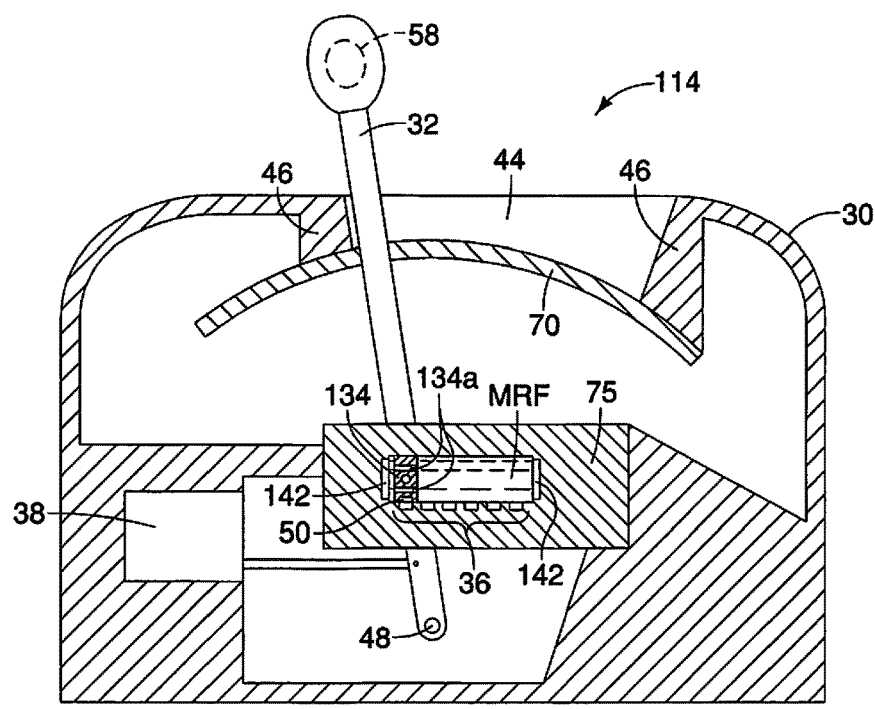
FIG. 11 is a cross-sectional side view of a shifter assembly in accordance with a third embodiment.

Referring now to FIG. 11, a shifter assembly 114 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The shifter assembly 114 includes the housing 30, the shifter member 32, the plurality of sensors 36, the positioning device 38, the optional vibration device 58 and the controller 56 (not shown in FIG. 11) as described above with respect to the first embodiment. The housing 30 includes the slot 44, the seal members 46, the pivot pin 48.

However, in the third embodiment, the housing 30 includes the arcuate sealing plate 70 (described above in the second embodiment) that contacts and slides against the seal members 46. The arcuate sealing plate 70 is rigidly attached to the shifter member 32 and moves therewith. The housing 30 further includes a cylinder structure 75 that is fixed in position within the housing 30. The cylinder structure 75 defines a chamber 140 that is filled with magnetorheological fluid MRF. The sensors 36 are mounted to an inner surface of the cylinder structure 75 adjacent to the chamber 140. The chamber 140 includes electromagnetic coils 142 at either end thereof.

In the third embodiment, a movement restrictor 134 is disposed within the cylinder structure 75. The movement restrictor 134 is basically a piston that moves within the chamber 140 following a linear path. The movement restrictor 134 is attached to the shifter member 32 for movement therewith via a connecting pin that is connected to the shifter member 32. The movement restrictor 134 also includes ports 134a through which the magnetorheological fluid MRF can flow in response to movement of the shifter member 32 and the movement restrictor 134. The sensor member 50 is further installed to the movement restrictor 134 for movement adjacent to the sensors 36.

The ports 134a of the movement restrictor 134 (the piston) extend from a first side of the movement restrictor 134 to a second side thereof and are dimensioned such that the magnetorheological fluid MRF flows therethrough between a first section and a second section of the chamber 140 in response to movement of the shifter member 32 and the movement restrictor 134 (the piston) between the first section of the chamber 140 and the second section of the chamber 140.

In the third embodiment, the movement restrictor 134 (the piston) and the chamber 140 have a cylindrical shape.

The logic used by the controller 56 is identical to that of the first embodiment.

Fourth Embodiment

Figure 12:
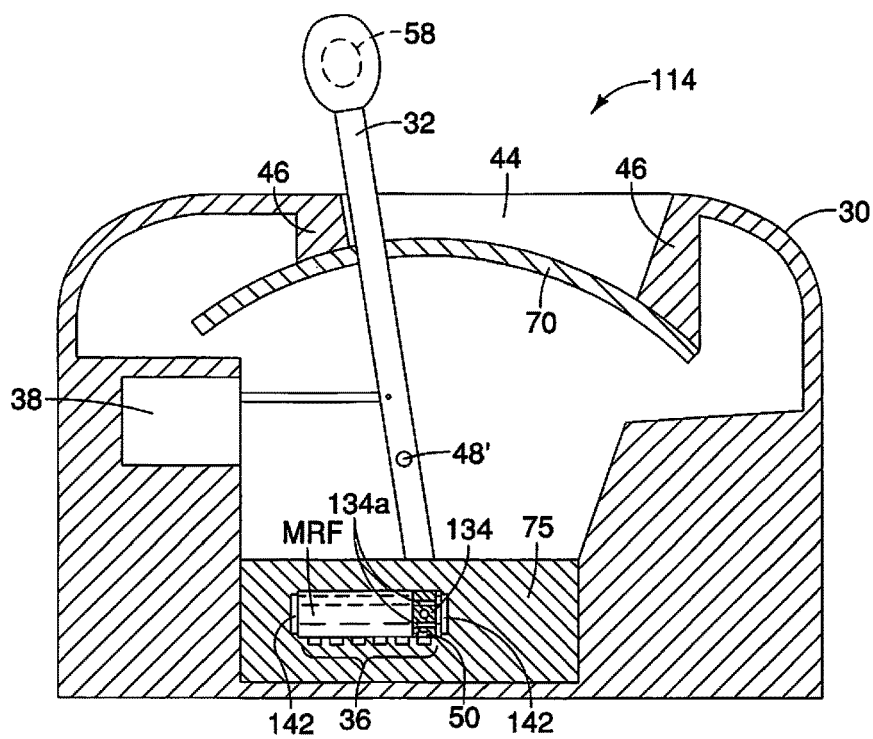
FIG. 12 is a cross-sectional side view of a shifter assembly in accordance with a fourth embodiment.

Referring now to FIG. 12, a shifter assembly 114' in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

The shifter assembly 114' includes the housing 30, the shifter member 32, the plurality of sensors 36, the positioning device 38, the optional vibration device 58 and the controller 56 (not shown in FIG. 12) as described above with respect to the first embodiment. The housing 30 includes the slot 44, the seal members 46 and a pivot pin 48'. The pivot pin 48' is installed to a location that is higher within the housing 30 that in the first, second and third embodiments.

Further, in the fourth embodiment, the housing 30 includes an arcuate sealing plate 70' similar to the arcuate sealing plate 70 of the second and third embodiments, that contacts and slides against the seal members 46. The arcuate sealing plate 70' is rigidly attached to the shifter member 32 and moves pivotally about the pivot pin 48' with the shifter member 32.

The housing 30 further includes a cylinder structure 75' that is fixed in position within the housing 30. The cylinder structure 75' defines the chamber 140 (same as in the third embodiment) that is filled with magnetorheological fluid MRF. The sensors 36 are mounted to an inner surface of the cylinder structure 75' adjacent to the chamber 140. The chamber 140 includes electromagnetic coils 142 at either end thereof.

In the fourth embodiment (as in the third embodiment), the movement restrictor 134 is disposed within the cylinder structure 75. The movement restrictor 134 moves within the chamber 140 following a linear path. The movement restrictor 134 is attached to the shifter member 32 for movement therewith via a connecting pin that is connected to the shifter member 32. The movement restrictor 134 also includes the ports 134a through which the magnetorheological fluid MRF can flow in response to movement of the shifter member 32 and the movement restrictor 134. The sensor member 50 is further installed to the movement restrictor 134 for movement adjacent to the sensors 36.

As in the third embodiment, the ports 134a of the movement restrictor 134 (the piston) extend from a first side of the movement restrictor 134 to a second side thereof and are dimensioned such that the magnetorheological fluid MRF flows therethrough between a first section and a second section of the chamber 140 in response to movement of the shifter member 32 and the movement restrictor 134 (the piston) between the first section of the chamber 140 and the second section of the chamber 140.

The logic used by the controller 56 is identical to that of the first embodiment.

Fifth Embodiment

Figure 13:
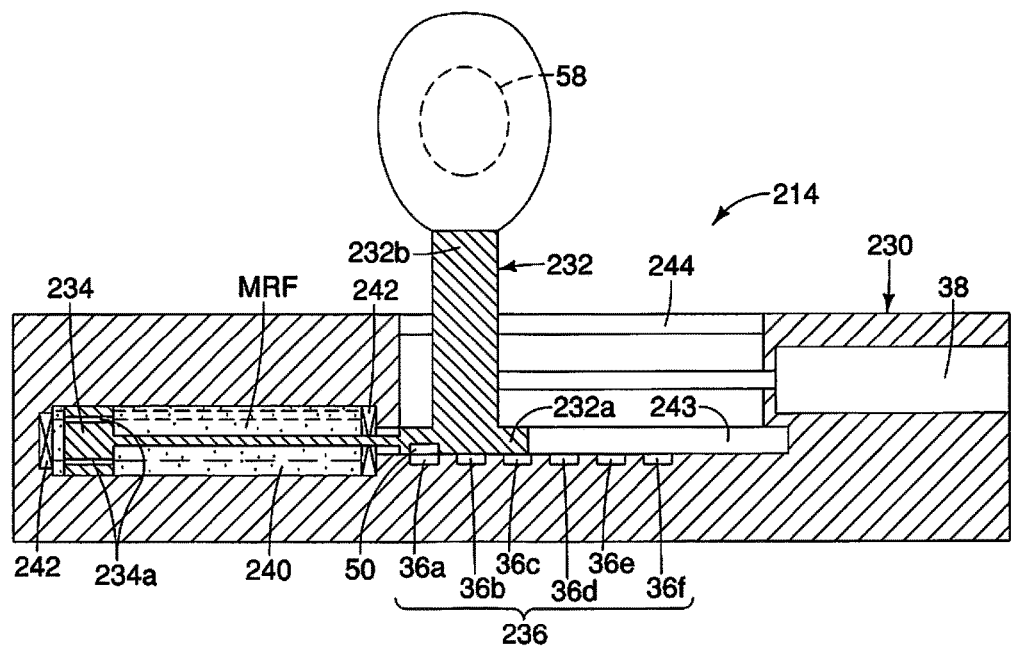
FIG. 13 is a cross-sectional side view of a shifter assembly showing a housing, a shifter member configured for linear movement relative to the housing, a movement restrictor and electromagnetic coils within chamber of the housing filled with magnetorheological fluid, and a positioning device, with the shifter member in the park position in accordance with a fifth embodiment.
Figure 14:
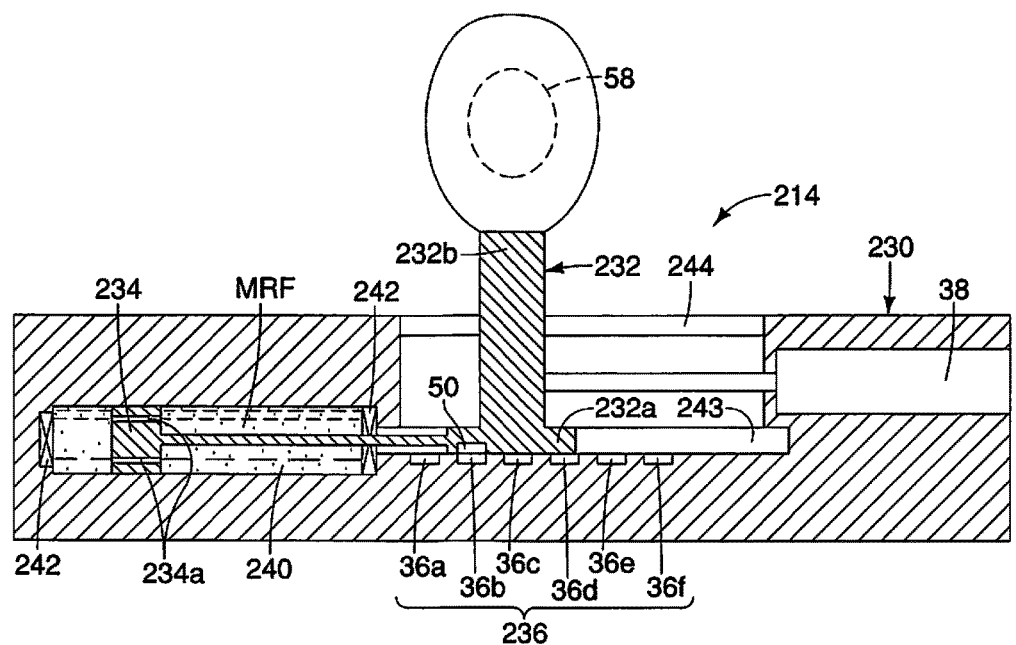
FIG. 14 is a cross-sectional side view of the shifter assembly depicted in FIG. 13 showing the shifter member in the reverse position in accordance with a fifth embodiment.
Figure 15:
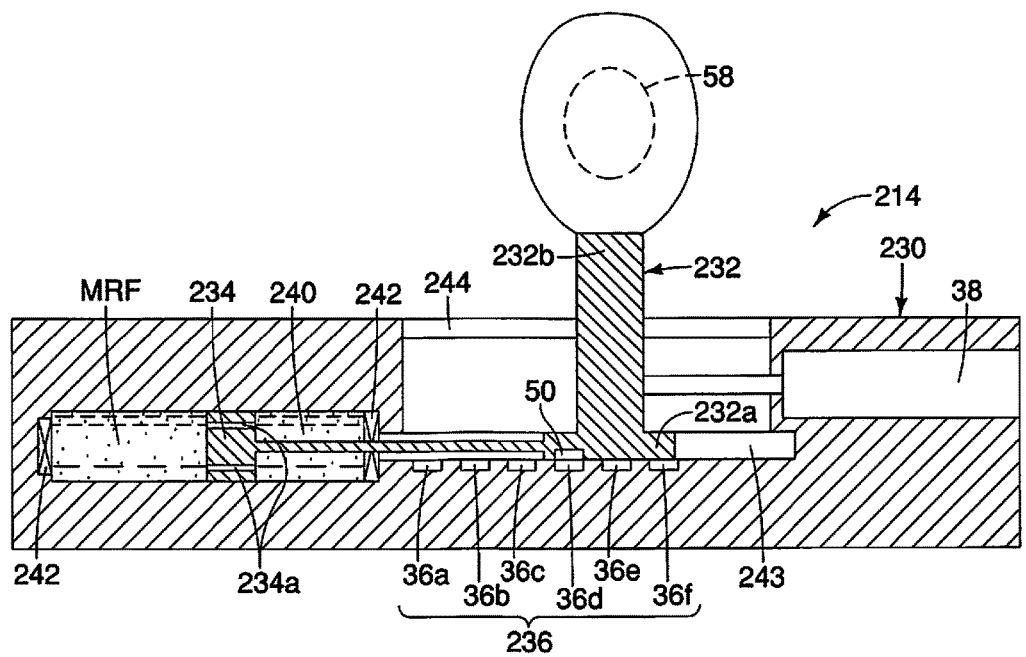
FIG. 15 is a cross-sectional side view of the shifter assembly depicted in FIGS. 13 and 14 showing the shifter member in the drive position in accordance with a fifth embodiment.

Referring now to FIGS. 13-15, a shifter assembly 214 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The shifter assembly 214 includes a housing 230 and a shifter member 232. The shifter assembly 214 further includes a plurality of sensors 236, the positioning device 38, the optional vibration device 58 and the controller 56 (not shown in FIGS. 13-15) as described above with respect to the first embodiment.

The plurality of sensors 236 include the park sensor 36a, the reverse sensor 36b, the neutral sensor 36c, the drive sensor 36d and the fixed gear sensor 36e, as described above with respect to the first embodiment. However, the sensors 236 can optionally include a second fixed gear sensor 36f. Further, the controller 56 is optionally configured to shift the automatic transmission 20 to a second fixed gear state.

The housing 230 defines a chamber 240 and includes a track portion 243 and a slot 244 along an upper surface of the housing 230. The shifter member 232 includes a lower guide section 232a and an upper lever section 232b. The lower guide section 232a is installed to the track portion 243 of the housing 230 for linear sliding movement. The upper lever section 232b extends upward through the slot 244. The sensor member 50 is installed to a lower surface of the lower guide section 232a of the shifter member 232.

The plurality of sensors 236 are mounted to an upper surface of the track portion 243 such that as the lower guide section 232a of the shifter member 232 slides along the track portion 243, the sensor member 50 moves above each of the sensors 36. Specifically, the shifter member 232 is shown in a park position in FIG. 13, a reverse position in FIG. 14 and a drive position in FIG. 15.

The chamber 240 is aligned with the track portion 243. The chamber 240 includes electromagnetic coils 242 at either end thereof, and is filled with magnetorheological fluid MRF. A movement restrictor 234 is disposed within the chamber 240 (a cylinder-like structure). The movement restrictor 234 moves within the chamber 240 following a linear path. The movement restrictor 234 is attached to the shifter member 232 via a connecting rod for movement therewith. The movement restrictor 234 also includes the ports 234a through which the magnetorheological fluid MRF can flow in response to movement of the shifter member 232 and the movement restrictor 234. The ports 234a of the movement restrictor 234 (a piston) extend from a first side of the movement restrictor 234 to a second side thereof and are dimensioned such that the magnetorheological fluid MRF flows therethrough between a first section and a second section of the chamber 240 in response to movement of the shifter member 232 and the movement restrictor 234 between the first section of the chamber 240 and the second section of the chamber 240.

The logic used by the controller 56 is identical to that of the first embodiment.

Sixth Embodiment

Figure 16:
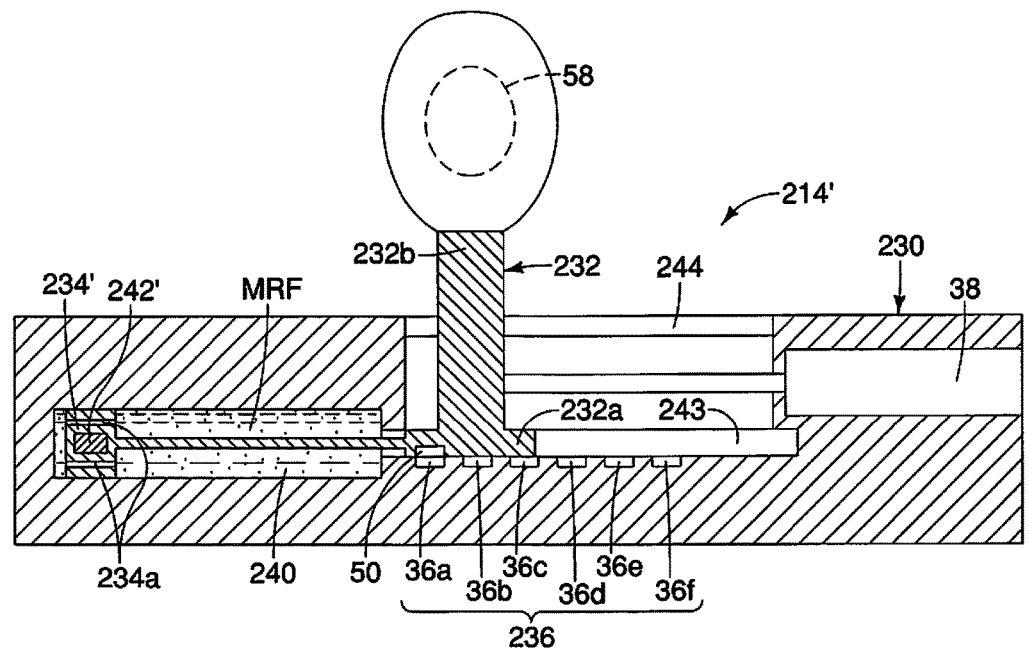
FIG. 16 is a cross-sectional side view of a shifter assembly showing a housing, a shifter member configured for linear movement relative to the housing, a movement restrictor with an electromagnetic coil installed within the movement restrictor, a chamber of the housing filled with magnetorheological fluid, and a positioning device, with the shifter member in the park position in accordance with a sixth embodiment.

Referring now to FIG. 16, a shifter assembly 214' in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity. The parts of the sixth embodiment that differ from the parts of the first embodiment will be indicated with a single prime (').

The shifter assembly 214' includes the housing 230 and the shifter member 232, as described above with respect to the fifth embodiment depicted in FIGS. 13-15. The shifter assembly 214' further includes the plurality of sensors 236, the positioning device 38, the optional vibration device 58 and the controller 56 (not shown in FIGS. 13-15) as described above with respect to the first embodiment.

The housing 230 defines the chamber 240 and includes the track portion 243 and the slot 244 along an upper surface of the housing 230. The shifter member 232 includes the lower guide section 232a and the upper lever section 232b, as described in the fifth embodiment. The lower guide section 232a is installed to the track portion 243 of the housing 230 for linear sliding movement. The upper lever section 232b extends upward through the slot 244. The sensor member 50 is installed to a lower surface of the lower guide section 232a of the shifter member 232.

The chamber 240 is aligned with the track portion 243. The chamber 240 is filled with magnetorheological fluid MRF. A movement restrictor 234' is disposed within the chamber 240 (a cylinder-like structure). The movement restrictor 234' moves within the chamber 240 following a linear path. The movement restrictor 234' is attached to the shifter member 232 via a connecting rod for movement therewith.

In the sixth embodiment, the movement restrictor 234' has been modified to include a electromagnetic coils 242'. Further, the chamber 240 does not include any electromagnetic coils. The movement restrictor 234' includes the ports 234a through which the magnetorheological fluid MRF can flow in response to movement of the shifter member 232 and the movement restrictor 234'. The ports 234a of the movement restrictor 234' (a piston) extend from a first side of the movement restrictor 234' to a second side thereof and are dimensioned such that the magnetorheological fluid MRF flows therethrough between a first section and a second section of the chamber 240 in response to movement of the shifter member 232 and the movement restrictor 234' between the first section of the chamber 240 and the second section of the chamber 240.

The logic used by the controller 56 is identical to that of the first embodiment.

Seventh Embodiment

Figure 17:
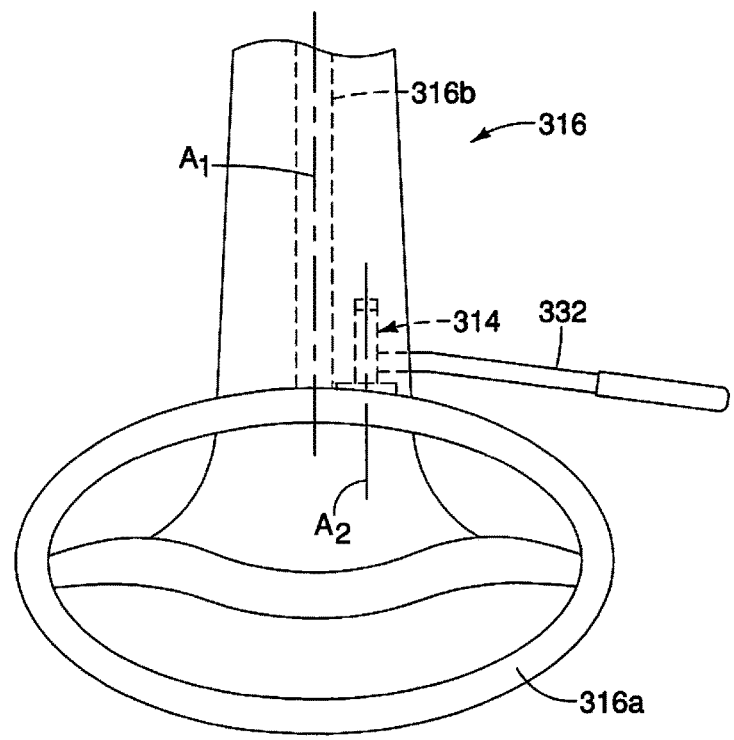
FIG. 17 is a top view of a steering column assembly that includes a shifter assembly in accordance with a seventh embodiment.
Figure 18:
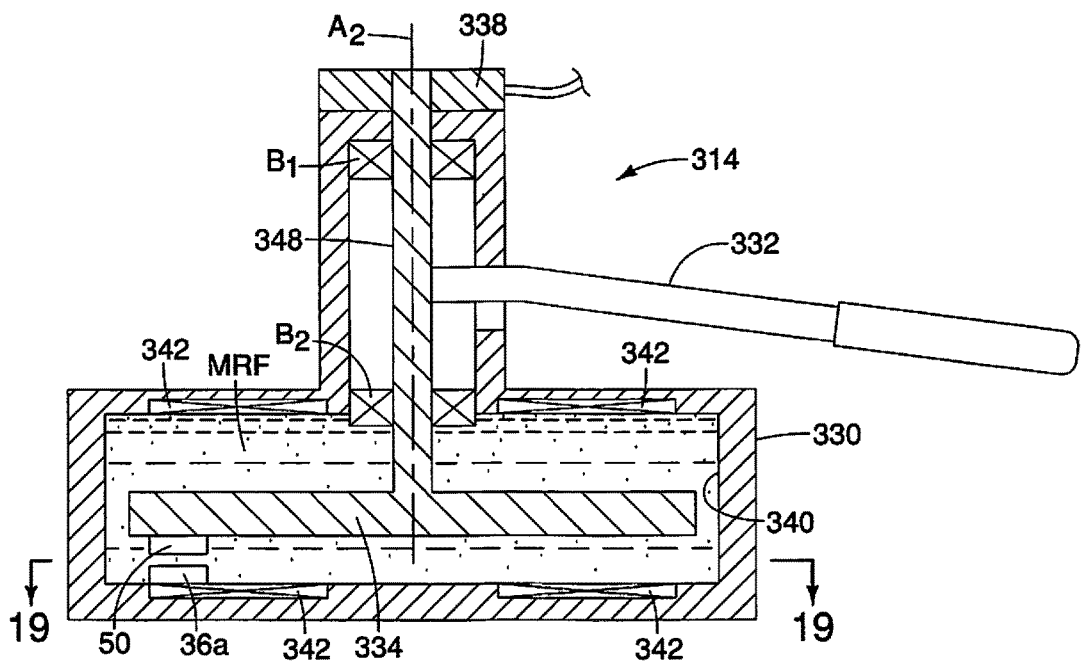
FIG. 18 is a cross-sectional top view of the shifter assembly depicted in FIG. 17, showing a housing, a shifter member, a movement restrictor and electromagnetic coils within a chamber of the housing filled with magnetorheological fluid, and a positioning device in accordance with the seventh embodiment.
Figure 19:
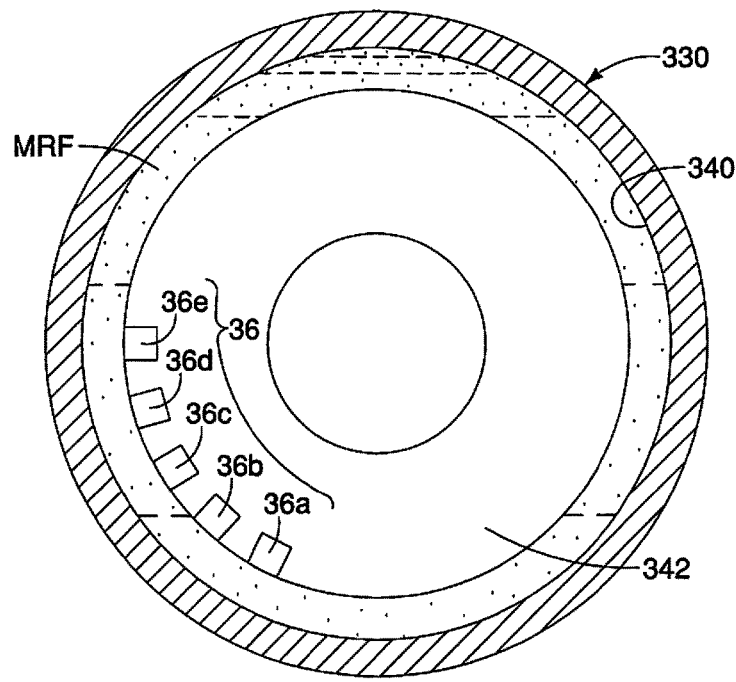
FIG. 19 is a cross-sectional view of the housing of the shifter member taken along the line 19-19 in FIG. 18, showing the chamber with one of the electromagnetic coils and the plurality of sensors in accordance with the seventh embodiment.
Figure 20:
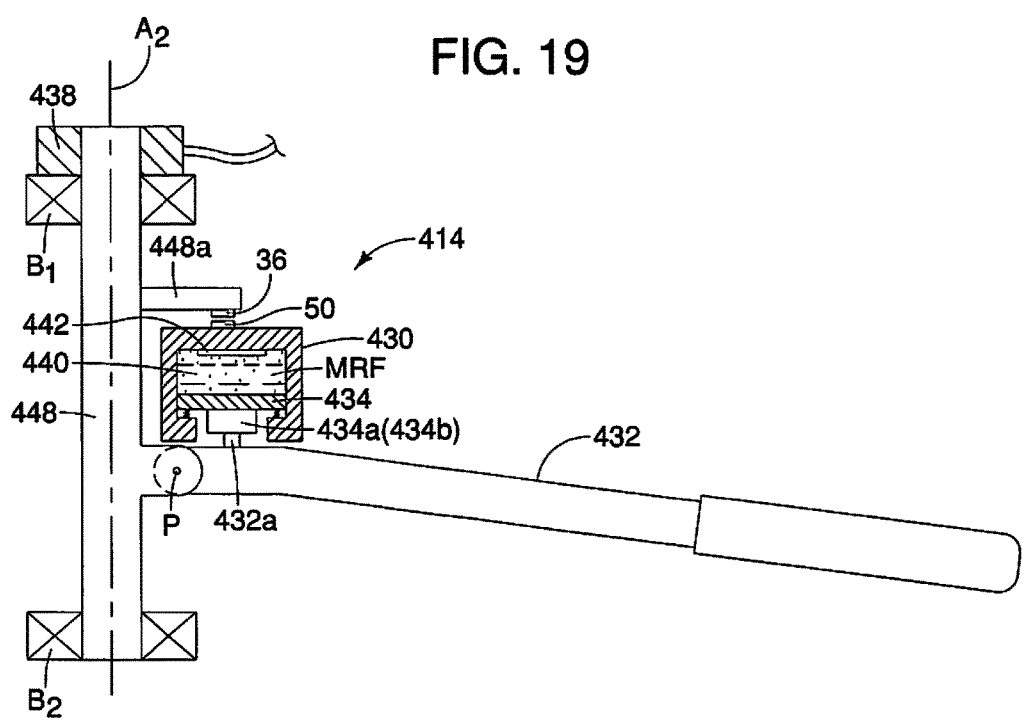
FIG. 20 is a cross-sectional top view of a shifter assembly showing a housing, a shifter member, a movement restrictor and an electromagnetic coil within a chamber of the housing filled with magnetorheological fluid, and a positioning device in accordance with an eighth embodiment.
Figure 21:
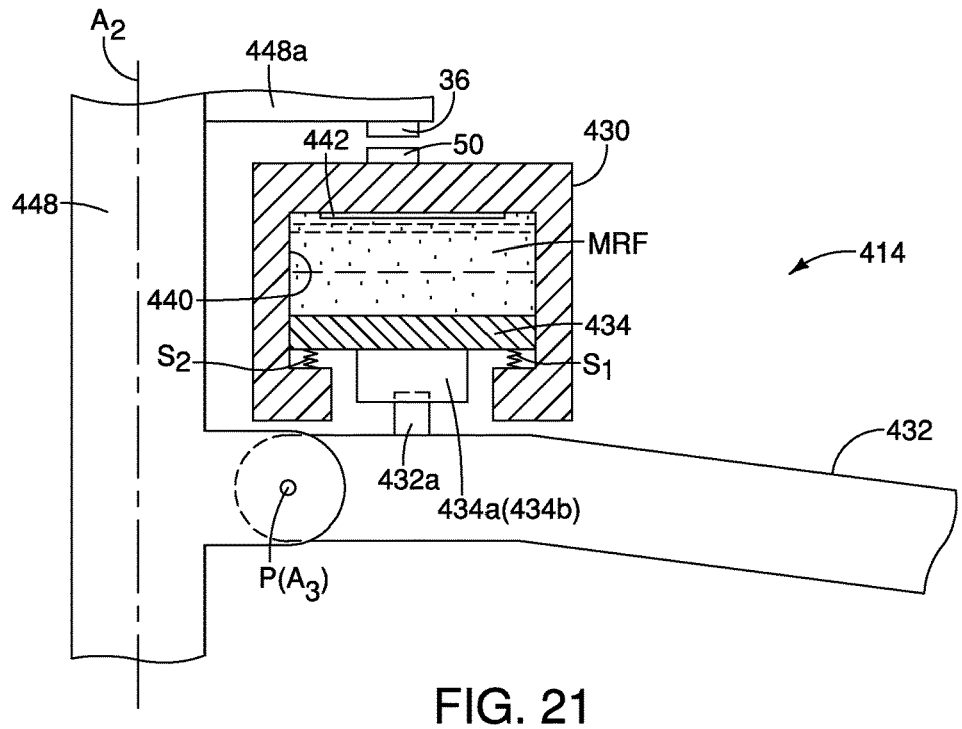
FIG. 21 is another cross-sectional top view of the shifter assembly showing the shifter member in a park position with a projection thereof being confined by projections of the movement restrictor, the movement restrictor being in a set or locked position in accordance with the eighth embodiment.

Referring now to FIGS. 17-19, a shifter assembly 314 installed to a steering column assembly 316 in accordance with a seventh embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The steering column assembly 316 is installed to the vehicle 10 of the first embodiment, replacing the steering column assembly 16. The shifter 14 of the first embodiment, is eliminated in the seventh embodiment and replaced with the shifter assembly 314 on the steering column. The steering column assembly 316 includes a steering wheel 316a and a steering shaft 316b that rotates about a steering axis $A_1$ the shifter assembly 314, which is installed thereto. The steering shaft 316b is connected to steering linkage (not shown) within the vehicle 10 in a conventional manner.

As shown in FIG. 18, the shifter assembly 314 includes a housing 330, a shifter member 332, a movement restrictor 334, the plurality of sensors 36 (as in the first embodiment) and a positioning device 338.

The housing 330 of the shifter assembly 314 is installed within the steering column assembly 316 by mechanical fasteners (not shown) but is basically concealed with an outer cover of the steering column assembly 316. The housing 330 defines a chamber 340 that is filled with magnetorheological fluid MRF. A plurality of electromagnetic coils 342 are installed within the chamber 340. The electromagnetic coils 342 are configured to selectively generate a magnetic field through the magnetorheological fluid MRF.

The shifter member 332 is attached to a shaft 348 that is supported within the housing for pivotal movement about a second axis $A_2$ by bearings $B_1$ and $B_2$. In the depicted embodiment, the first axis $A_1$ and the second axis $A_2$ are parallel to one another. However, it should be understood from the drawings and description herein that the first axis $A_1$ and the second axis $A_2$ can be angularly offset from one another, and in alternative embodiments need not be parallel to one another. The bearing $B_2$ includes a seal (not shown) that seals the chamber 340 such that the magnetorheological fluid MRF is retained within the chamber 340. Although not shown, the shifter member 332 can be moved or shifted to each of a park position, a reverse position, a neutral position, a drive position and a fixed gear position, corresponding to settings of operation of the automatic transmission (not shown).

The movement restrictor 334 is fixed to the shaft 348 for rotation with the shaft 348 and the shifter member 332 within the chamber 340 of the housing 330. The movement restrictor 334 includes the sensor member 50, as described above with respect to the first embodiment. The plurality of sensors 36 (sensors 36a, 36b, 36c, 36d and 36e are installed to an inner surface of the chamber 340 such that as the shifter member 332 is moved between the various positions (the park position, the reverse position, the neutral position, the drive position and the fixed gear position—not shown) the sensor member 50 is moved adjacent to corresponding ones of the plurality of sensor member 36 in a manner consistent with that described above with respect to the first embodiment. More specifically, when the shifter member 332 and hence the sensor member 50 on the movement restrictor 334 are moved to the park position, the sensor member 50 is located adjacent to the sensor 36a (a first of the plurality of sensors 36 corresponding to the parked state of the automatic transmission 20). When the shifter member 332 and the sensor member 50 are moved to the reverse position, the sensor member 50 is located adjacent to the sensor 36b (a second of the plurality of sensors 36 corresponding to the reverse state of the automatic transmission 20). Further, when the shifter member 332 and the sensor member 50 are moved to the drive position, the sensor member 50 is located adjacent to the sensor 36d (a third of the plurality of sensors 36 corresponding to the drive state of the automatic transmission 20).

The movement restrictor 334 is configured to selectively restrict movement of the shifter member 332 in response to changes in viscosity of the magnetorheological fluid MRF induced by operation of the electromagnetic coils 342. Specifically, as the magnetic field strength, or magnetic field density of the electromagnetic coils 342 is increased, the viscosity (thickness) of the magnetorheological fluid MRF increases, restricting movement of the movement restrictor 334. Put another way, the increase in magnetic field density applied to the magnetorheological fluid MRF causes an increased level of friction acting on the movement restrictor 334 which in turn acts against movement of the movement restrictor 334.

The positioning device 338 operates in a manner consistent with the positioning device 38 of the first embodiment. Specifically, when operating in the autonomous mode, the controller 56 (not shown in FIGS. 17-19) operates the positioning device 338 to position the shifter member 332 and the sensor member 50 in a position that causes the automatic transmission 20 to shift to the desired mode of operation (reverse, drive, fixed gear, neutral or parked).

The positioning device 338 is connected to the housing 330 and connected to the shaft 348 and hence the shifter member 332. The positioning device 338 is configured to selectively position the shifter member 332 to any of the park position, the reverse position and the drive position in response to electronic signals received by the controller 56. The positioning device 338 can be, for example, a stepper motor mechanically connected to the shaft 348 such that the stepper motor moves the shaft 348 and the shifter member 332 to the desired position in response to a signal from the electronic controller 56.

The logic used by the controller 56 is identical to that of the first embodiment.

Eighth Embodiment

Referring now to FIGS. 20-24, a shifter assembly 414 in accordance with a eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

As with the shifter assembly 314 of the seventh embodiment, the shifter assembly 414 is installed to the steering column assembly 316, thereby replacing the shifter assembly 314.

As shown in FIGS. 20-24, the shifter assembly 314 includes a housing 430, a shifter member 432, a movement restrictor 434, the plurality of sensors 36 (as in the first embodiment) and a positioning device 438.

The housing 430 of the shifter assembly 414 is installed within the steering column assembly 316 replacing the shifter assembly 314 of the seventh embodiment.

The housing 430 defines a chamber 440 that is filled with magnetorheological fluid MRF. At least one electromagnetic coil 442 is installed within the chamber 440. The chamber 440 is fixedly and non-movably attached to the steering column assembly 316 via mechanical fasteners (not shown). The electromagnetic coil 442 is configured to selectively generate a magnetic field through the magnetorheological fluid MRF.

The shifter member 432 is attached to a shaft 448 that is supported to the steering column 316 (seventh embodiment) for pivotal movement about a second axis $A_2$ by bearings $B_1$ and $B_2$. In the eighth embodiment, the first axis $A_1$ (not shown) and the second axis $A_2$ are parallel to one another. However, it should be understood from the drawings and description herein that the first axis $A_1$ and the second axis $A_2$ can be angularly offset from one another, and in alternative embodiments need not be parallel to one another. The shifter member 432 can be moved or shifted to each of a park position, a reverse position, a neutral position, a drive position and a fixed gear position, corresponding to settings of operation of the automatic transmission (not shown).

The shifter member 432 is further pivotally connected to the shaft 448 such that the shifter member 432 pivots about a pivot pin P about a third axis $A_3$ between a set position (FIGS. 20 and 21) and a shifting position (FIG. 22), as is described in greater detail below. A spring (not shown) biases the shifter member 432 to the set position shown in FIGS. 20 and 21.

Figure 23:
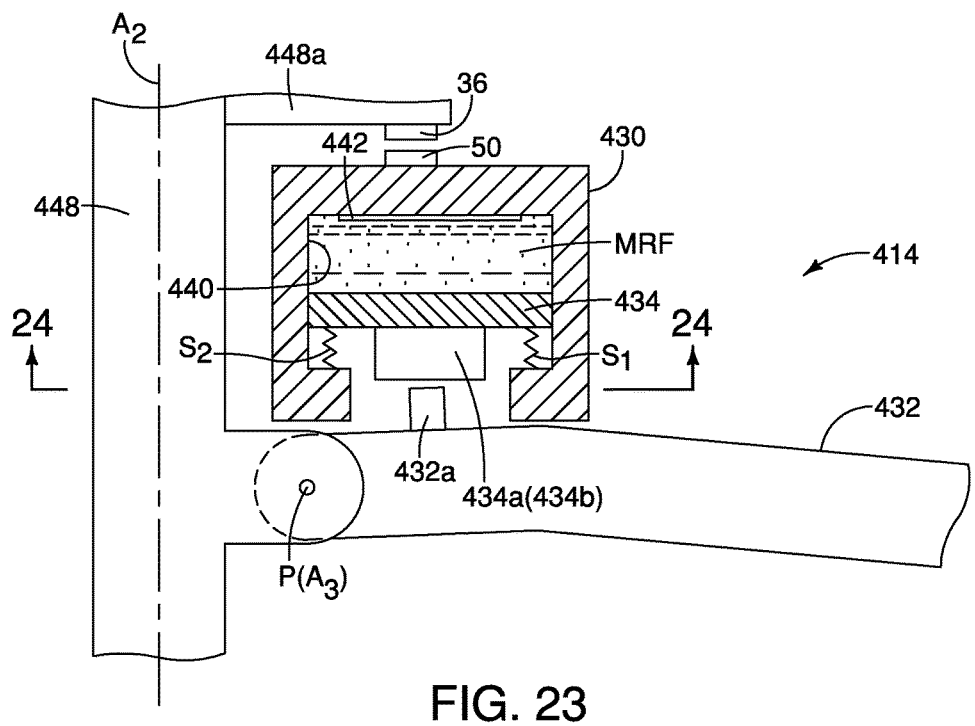
FIG. 23 is still another cross-sectional top view of the shifter assembly depicted in FIGS. 21 and 22 showing the shifter member in the park position but with the movement restrictor being in a release or shifting position allowing movement of the shifter member in accordance with the eighth embodiment.

The movement restrictor 434 is moveably installed within the chamber 440 of the housing 330 for linear movement. A pair of springs $S_1$ and $S_2$ bias the movement restrictor 434 toward a first position (a shifting position), as shown in FIG. 23. When the electromagnetic coil 442 is provided with current to generate a magnetic field through the magnetorheological fluid MRF, the magnetorheological fluid MRF thickens (increased viscosity, and linear alignment of magnetic particles), pushing the movement restrictor 434 to a second position (a set or locked position) shown in FIGS. 20-21 and 24.

In the second or locked position, the movement restrictor 434 is positioned to prevent the shifter member 432 from moving out of the park position. Specifically, the movement restrictor 434 includes a pair of projections 434a and 434b shown in FIG. 24. Correspondingly, the shifter member 432 includes a projection 432a. With the movement restrictor 434 in its set position, and with the shifter member 434 biased into its set or locked position (see FIGS. 20, 21 and 24) while in the park position, the projection 432a is trapped between the projections 434a and 434b of the movement restrictor 434. With no current provided to the coils 442, the magnetorheological fluid MRF becomes more fluid allowing the springs S1 and S2 to push the movement restrictor 434 to the first position (shifting position). Hence, with the movement restrictor 434 (a piston) in the second position (locked position), the projections 434a and 434b extends toward the shifter member 432 such that with the projections 434a and 434b of the movement restrictor 434 prevent movement of the projection 432a and the shifter member 432, with the shifter member 432 in the park position.

Figure 24:
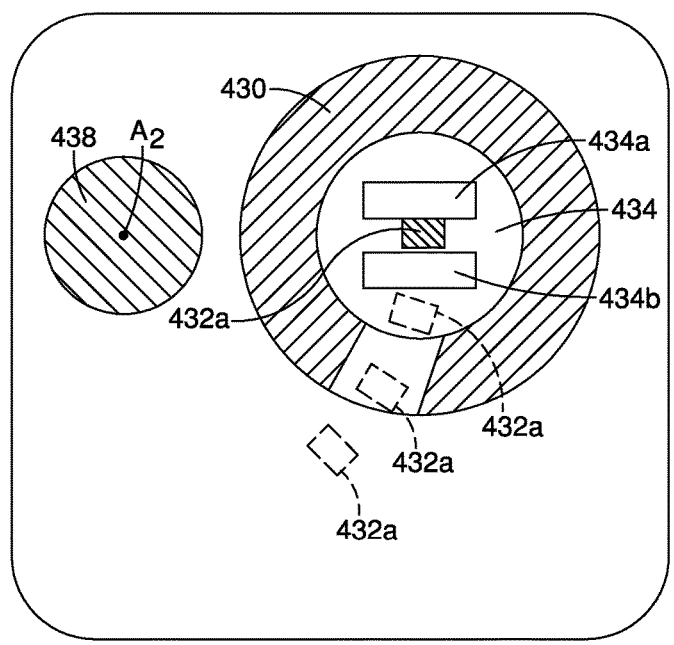
FIG. 24 is cross-sectional view of the shifter assembly taken along the line 24-24 in FIG. 23 showing the shifter member in the park position with the protrusion of the shifter member being located between the protrusions of the movement restrictor in accordance with the eighth embodiment.

In FIG. 24, the projection 432a of the shifter member 432 is shown trapped between the projections 434a and 434b. This depiction represents the shifter member 432 in the park position. The three phantom (dashed line) depictions of the projection 432b of the shifter member 4432 in FIG. 24, represent the shifter member 432 (and projection 432a) moved to each of the reverse position, the neutral position and the drive position.

As shown in FIG. 23, the movement restrictor 432 is moved via the biasing force of the spring $S_1$ and $S_2$ such that the shifter member 432 is free to undergo pivoting (shifting) movement about the second axis $A_2$.

Figure 22:
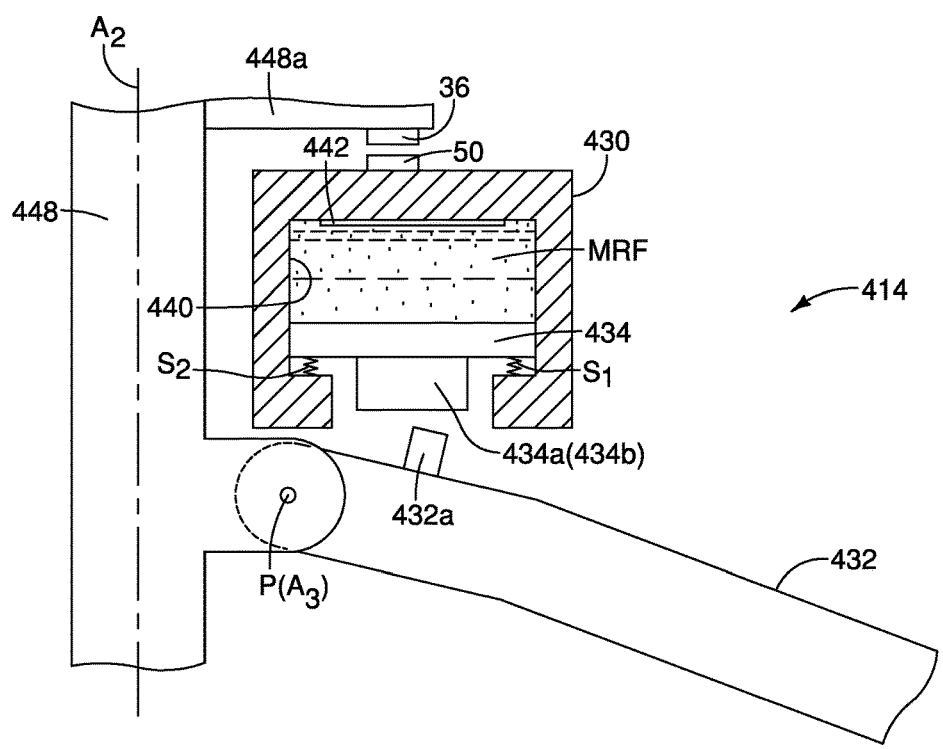
FIG. 22 is another cross-sectional top view of the shifter assembly depicted in FIG. 21 showing the shifter member pivoted to a shifting position with the projection thereof being pulled away from the projections of the movement restrictor, the movement restrictor being in the set or locked position in accordance with the eighth embodiment.

As shown in FIG. 22, when the shifter member 432 is pulled by a vehicle operator such that the protrusion 432 is moved away from the protrusions 434a and 434b of the movement restrictor 432, the shifter member 432 is free to undergo pivoting (shifting) movement about the second axis $A_2$.

As shown in FIGS. 20-23, a sensor plate 448a is fixedly attached to the shaft 448 for rotation or pivoting movement therewith. The sensors 36 (as described above with respect to the first embodiment) are installed to the sensor plate 448a at spaced apart intervals radially about the second axis $A_2$ in a manner that is generally the same as the spacing and arrangement of the sensors 36 of the seventh embodiment, as shown in FIG. 19. Specifically, as the shifter member 432, the shaft 448 and the sensor plate 448a are moved between the various shift positions, the sensor plate 448a and the sensors 36 are moved adjacent to the sensor member 50 providing shifting signals to the controller 56, as described in the first embodiment.

The electronic controller 56 operates in a manner consistent with the description above with respect to the first embodiment. Specifically, the electronic controller 56 is connected to the plurality of sensors 36, the electromagnetic coil 442, the positioning device 438, the vehicle transmission 20 and the autonomous vehicle operation controller 22. The electronic controller 56 is configured to operate in a manual mode and an autonomous vehicle mode.

Specifically, in the manual mode, in response to the electronic controller 56 detecting position changes of the shifter member 432, the electronic controller 56 transmits corresponding signals to the vehicle transmission 20 in order to change the vehicle transmission 20 to one of the parked state, the reverse state and the drive state, in response to determining that the shifter member 432 has moved to a corresponding one of the park position, the reverse position and the drive position.

Further, in the autonomous vehicle mode, the electronic controller 56 transmits signals to the coil 442 to control movement of the movement restrictor 434 between the first position and the second position, and sends signals to the vehicle transmission 20 changing the vehicle transmission 20 to one of the parked state, the reverse state in response to signals from the autonomous vehicle operation controller 22 and further operates the positioning device 438 to move the shifter member 432 to a corresponding one of the park position, the reverse position and the drive position.

The positioning device 438 operates in a manner consistent with the positioning device 38 of the first embodiment. The positioning device 438 is connected to the shaft 448 and hence the shifter member 432. The positioning device 438 is configured to selectively position the shifter member 432 to any of the park position, the reverse position and the drive position in response to electronic signals received by the controller 56. Simultaneously, the coil 442 can be engaged and disengaged to allow the controller 56 to move the shifter member 432 in and out of the park position. The positioning device 438 can be, for example, a stepper motor mechanically connected to the shaft 448 such that the stepper motor moves the shaft 448 and the shifter member 432 to the desired position in response to a signal from the electronic controller 56.

The logic used by the controller 56 is identical to that of the first embodiment.

The autonomous vehicle controller 22 and the electronic controller 56 can be combined in a single electronic controller device, or can be separate electronic devices or circuits that communication with on another. Each of the autonomous vehicle controller 22 and the electronic controller 56 preferably includes a microcomputer with an autonomous vehicle and shifter control program that controls the vehicle 10, the automatic transmission 20, and/or the shifter assembly 14, 14', 114, 214, 214', 314 and 414. The controller 56 can also include other conventional components such as an input interface circuit, an output interface circuit, and storage devices such as a ROM (Read Only Memory) device and a RAM (Random Access Memory) device. The microcomputer of the controller 56 is programmed to control the vehicle 10, the automatic transmission 20, and/or the shifter assembly 14, 14', 114, 214, 214', 314 and 414. The memory circuit stores processing results and control programs such as ones for vehicle, transmission, and shifter operation that are run by the processor circuit. The controller 56 is operatively coupled to various components of the vehicle 10, the automatic transmission 20, and the shifter assemblies 14, 14', 114, 214, 214', 314 and 414 in a conventional manner consistent with shift-by-wire technology. The internal RAM of the controller 56 stores statuses of operational flags and various control data. The internal ROM of the controller 56 stores instructions and device communication protocols for various operations. The controller 56 is capable of selectively controlling any of the components of the control system in accordance with the control program. It will be apparent to those skilled in the art from this disclosure that the precise structure and algorithms for the controller 56 can be any combination of hardware and software that will carry out the functions of the present invention.

The various elements of the vehicle 10, other that the embodiments of the shifter assemblies described above, are conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle automatic transmission shifter assembly. Accordingly, these terms, as utilized to describe the present invention should be interpreted relative to a vehicle equipped with the vehicle automatic transmission shifter assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission shifter assembly, comprising:
   a housing having a pivot pin supported therein, the housing further defining a chamber with magnetorheological fluid disposed therein, the housing further includes at least one electromagnetic coil configured to selectively generate a plurality of levels of magnetic field densities through the magnetorheological fluid;
   a shifter member supported by the pivot pin to the housing for pivoting movement about the pivot pin between at least a park position, a reverse position and a drive position;
   a movement restrictor connected to the shifter member for movement therewith, the movement restrictor being disposed within the chamber of the housing for movement between a first section of the chamber and a second section of the chamber with the magnetorheological fluid providing one of a plurality of levels of movement resistance to the movement restrictor during movement between the first section and second section of the chamber, each of the plurality of levels of movement resistance being induced by a corresponding one of the plurality of levels of magnetic field densities generated by the electromagnetic coil;
   a plurality of sensors positioned and configured to detect changes in position of the shifter member; and
   a positioning device within the housing and connected to the shifter member, the positioning device being configured to selectively position the shifter member to any of the park position, the reverse position and the drive position in response to electronic signals received by the positioning device.

2. The automatic transmission shifter assembly according to claim 1, further comprising:
   an electronic controller connected to the plurality of sensors, the at least one electromagnetic coil, the positioning device, a vehicle transmission and an autonomous vehicle operation controller, the electronic controller being configured to operate in a manual mode and an autonomous vehicle mode such that:
   in the manual mode, in response to the electronic controller detecting position changes of the shifter member, the electronic controller operates the electromagnetic coils in order to adjust the level of movement resistance to the movement restrictor and the shifter member in response to determining that the shifter member is moving between the park position, the reverse position and the drive position, and the electronic controller transmits corresponding signals to the vehicle transmission in order to change the vehicle transmission to one of a parked state, a reverse state and a drive state, in response to determining that the shifter member has moved to a corresponding one of the park position, the reverse position and the drive position; and in the autonomous vehicle mode, the electronic controller transmits signals to the vehicle transmission changing the vehicle transmission to one of the parked state, the reverse state and the drive state in response to signals from the autonomous vehicle operation controller and further operates the positioning device to move the shifter member to a corresponding one of the park position, the reverse position and the drive position.

3. The automatic transmission shifter assembly according to claim 2, wherein
the positioning device is a stepper motor mechanically connected to the shifter member such that the stepper motor moves the shifter member to one of the park position, the reverse position and the drive position in response to a signal from the electronic controller.

4. The automatic transmission shifter assembly according to claim 1, wherein
the chamber defined within the housing is spaced apart from the pivot pin.

5. The automatic transmission shifter assembly according to claim 4, wherein
the positioning device is located between the pivot pin and the chamber.

6. The automatic transmission shifter assembly according to claim 1, further comprising
the movement restrictor includes a piston disposed within the chamber and attached to the shifter member for movement therewith such that the piston is moved between the first section of the chamber and the second section of the chamber in response to pivoting movement of shifter member about the pivot pin, and
the piston defines a port that extends from a first side of the piston to a second side of the piston dimensioned such that the magnetorheological fluid flows therethrough between the first section and the second section of the chamber in response to movement of the shifter member and the piston between the first section of the chamber and the second section of the chamber.

7. The automatic transmission shifter assembly according to claim 6, wherein
the piston has an arcuate shape and moves along an arcuate path between the first section and the second section of the chamber.

8. The automatic transmission shifter assembly according to claim 6, wherein
the piston has a cylindrical shape and moves along a linear path between the first section and the second section of the chamber.

9. The automatic transmission shifter assembly according to claim 1, wherein
the positioning device is a stepper motor mechanically connected to the shifter member such that the stepper motor moves the shifter member to one of the park position, the reverse position and the drive position in response to a signal from the electronic controller.

10. The automatic transmission shifter assembly according to claim 1, wherein
the housing is configured to install to a center console within a passenger compartment of a vehicle.

11. An automatic transmission shifter assembly, comprising:
a housing defining a chamber with magnetorheological fluid disposed therein, the housing further includes at least one electromagnetic coil configured to selectively generate a plurality of levels of magnetic field densities through the magnetorheological fluid;
a shifter member supported to the housing for movement between at least a park position, a reverse position and a drive position, the shifter member being configured and structured to undergo linear movement with respect to the housing;
a movement restrictor connected to the shifter member for movement therewith, the movement restrictor being disposed within the chamber of the housing for movement between a first section of the chamber and a second section of the chamber with the magnetorheological fluid providing one of a plurality of levels of movement resistance to the movement restrictor during movement between the first section and second section of the chamber, each of the plurality of levels of movement resistance being induced by a corresponding one of the plurality of levels of magnetic field densities generated by the electromagnetic coil;
a plurality of sensors positioned and configured to detect changes in position of the shifter member; and
a positioning device within the housing and connected to the shifter member, the positioning device being configured to selectively position the shifter member to any of the park position, the reverse position and the drive position in response to electronic signals received by the positioning device.

12. The automatic transmission shifter assembly according to claim 11, wherein
the housing includes a track portion, and the shifter member includes a base portion slidably disposed within the track portion.

13. The automatic transmission shifter assembly according to claim 12, wherein
the chamber is aligned with the track portion.

14. The automatic transmission shifter assembly according to claim 11, further comprising
the movement restrictor includes a piston disposed within the chamber and attached to the shifter member for movement therewith such that the piston is moved between the first section of the chamber and the second section of the chamber in response to pivoting movement of shifter member, and
the piston defines a port that extends from a first side of the piston to a second side of the piston dimensioned such that the magnetorheological fluid flows therethrough between the first section and the second section of the chamber in response to movement of the shifter member and the piston between the first section of the chamber and the second section of the chamber.

* * * * *